United States Patent
Shamlian et al.

(10) Patent No.: US 8,862,271 B2
(45) Date of Patent: Oct. 14, 2014

(54) PROXIMITY SENSING ON MOBILE ROBOTS

(71) Applicant: iRobot Corporation, Bedford, MA (US)

(72) Inventors: Steven V. Shamlian, Watertown, MA (US); Samuel Duffley, Cambridge, MA (US); Nikolai Romanov, Oak Park, CA (US); Frederick D. Hook, Fontana, CA (US); Mario E. Munich, La Canada Flintridge, CA (US); Dhiraj Goel, Pasadena, CA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 14/033,922

(22) Filed: Sep. 23, 2013

(65) Prior Publication Data

US 2014/0088761 A1 Mar. 27, 2014

Related U.S. Application Data

(60) Provisional application No. 61/704,419, filed on Sep. 21, 2012.

(51) Int. Cl.
*G05B 15/00* (2006.01)
*G05B 19/00* (2006.01)
*G06F 19/00* (2011.01)
*G05B 19/04* (2006.01)
*G05D 1/02* (2006.01)

(52) U.S. Cl.
CPC .................................. *G05D 1/0238* (2013.01)
USPC ........... 700/259; 700/245; 700/254; 700/255; 700/258

(58) Field of Classification Search
CPC ... G05D 1/0238; G05D 1/024; G05D 1/0242; G05D 1/0255

USPC ........ 700/245, 254, 255, 258, 259; 901/1, 46, 901/47; 701/208

See application file for complete search history.

(56) References Cited

U.S. PATENT DOCUMENTS

| | | |
|---|---|---|
| 1,780,221 A | 11/1930 | Buchmann |
| 1,970,302 A | 8/1934 | Gerhardt |

(Continued)

FOREIGN PATENT DOCUMENTS

| | | |
|---|---|---|
| KR | 10-2008-0045523 A | 5/2008 |
| KR | 10-2009-0019479 A | 2/2009 |

OTHER PUBLICATIONS

International Search Report and Written Opinion for WO Application No. PCT/US2013/061183, dated Dec. 26, 2013.

*Primary Examiner* — Khoi Tran
*Assistant Examiner* — Robert Nguyen
(74) *Attorney, Agent, or Firm* — Honigman Miller Schwartz and Cohn LLP

(57) ABSTRACT

A proximity sensor includes first and second sensors disposed on a sensor body adjacent to one another. The first sensor is one of an emitter and a receiver. The second sensor is the other one of an emitter and a receiver. A third sensor is disposed adjacent the second sensor opposite the first sensor. The third sensor is an emitter if the first sensor is an emitter or a receiver if the first sensor is a receiver. Each sensor is positioned at an angle with respect to the other two sensors. Each sensor has a respective field of view. A first field of view intersects a second field of view defining a first volume that detects a floor surface within a first threshold distance. The second field of view intersects a third field of view defining a second volume that detects a floor surface within a second threshold distance.

20 Claims, 21 Drawing Sheets

(56) References Cited

U.S. PATENT DOCUMENTS

| | | |
|---|---|---|
| 2,136,324 A | 11/1938 | John |
| 2,302,111 A | 11/1942 | Dow et al. |
| 3,978,539 A | 9/1976 | Yonkers |
| 4,004,313 A | 1/1977 | Capra et al. |
| 4,445,245 A | 5/1984 | Lu |
| 4,624,026 A | 11/1986 | Olson et al. |
| 5,018,240 A | 5/1991 | Holman |
| 5,070,567 A | 12/1991 | Holland |
| 5,208,521 A | 5/1993 | Aoyama |
| 5,254,853 A | 10/1993 | Reich |
| 5,261,139 A | 11/1993 | Lewis |
| 5,276,618 A | 1/1994 | Everett, Jr. |
| 5,279,672 A | 1/1994 | Betker et al. |
| 5,293,955 A | 3/1994 | Lee |
| 5,309,592 A | 5/1994 | Hiratsuka |
| 5,341,540 A | 8/1994 | Soupert et al. |
| 5,542,148 A | 8/1996 | Young |
| 5,568,589 A | 10/1996 | Hwang |
| 5,787,545 A | 8/1998 | Colens |
| 5,815,880 A | 10/1998 | Nakanishi |
| 5,896,611 A | 4/1999 | Haaga |
| 5,911,260 A | 6/1999 | Suzuki |
| 5,995,883 A | 11/1999 | Nishikado |
| 5,996,167 A | 12/1999 | Close |
| 6,021,545 A | 2/2000 | Delgado et al. |
| 6,030,464 A | 2/2000 | Azevedo |
| 6,052,821 A | 4/2000 | Chouly et al. |
| 6,076,226 A | 6/2000 | Reed |
| 6,122,798 A | 9/2000 | Kobayashi et al. |
| 6,226,830 B1 | 5/2001 | Hendriks et al. |
| 6,276,478 B1 | 8/2001 | Hopkins et al. |
| 6,286,181 B1 | 9/2001 | Kasper et al. |
| 6,389,329 B1 | 5/2002 | Colens |
| 6,421,870 B1 | 7/2002 | Basham et al. |
| 6,459,955 B1 | 10/2002 | Bartsch et al. |
| 6,481,515 B1 | 11/2002 | Kirkpatrick et al. |
| 6,482,252 B1 | 11/2002 | Conrad et al. |
| 6,532,404 B2 | 3/2003 | Colens |
| 6,590,222 B1 | 7/2003 | Bisset et al. |
| 6,594,844 B2 * | 7/2003 | Jones .................... 15/49.1 |
| 6,605,156 B1 | 8/2003 | Clark et al. |
| 6,690,134 B1 | 2/2004 | Jones et al. |
| 6,741,054 B2 | 5/2004 | Koselka et al. |
| 6,781,338 B2 | 8/2004 | Jones et al. |
| 6,809,490 B2 | 10/2004 | Jones et al. |
| 6,883,201 B2 | 4/2005 | Jones et al. |
| 6,965,209 B2 | 11/2005 | Jones et al. |
| 7,013,527 B2 | 3/2006 | Thomas, Sr. et al. |
| 7,155,308 B2 * | 12/2006 | Jones .................... 700/245 |
| 7,167,775 B2 | 1/2007 | Abramson et al. |
| 7,173,391 B2 | 2/2007 | Jones et al. |
| 7,196,487 B2 | 3/2007 | Jones et al. |
| 7,430,455 B2 * | 9/2008 | Casey et al. ............ 700/245 |
| 7,448,113 B2 | 11/2008 | Jones et al. |
| 7,571,511 B2 | 8/2009 | Jones et al. |
| 7,636,982 B2 | 12/2009 | Jones et al. |
| 7,720,572 B2 * | 5/2010 | Ziegler et al. .......... 700/245 |
| 7,957,837 B2 * | 6/2011 | Ziegler et al. .......... 700/258 |
| 8,195,333 B2 * | 6/2012 | Ziegler et al. .......... 700/259 |
| 8,478,442 B2 * | 7/2013 | Casey et al. ............ 700/245 |
| 8,565,920 B2 * | 10/2013 | Casey et al. ............ 700/253 |
| 8,761,935 B2 * | 6/2014 | Casey et al. ............ 700/253 |
| 8,788,092 B2 * | 7/2014 | Casey et al. ............ 700/245 |
| 2001/0037163 A1 | 11/2001 | Allard |
| 2001/0047231 A1 | 11/2001 | Peless et al. |
| 2002/0016649 A1 * | 2/2002 | Jones ..................... 700/245 |
| 2002/0120364 A1 | 8/2002 | Colens |
| 2003/0025472 A1 | 2/2003 | Jones et al. |
| 2004/0020000 A1 * | 2/2004 | Jones ..................... 15/319 |
| 2004/0031113 A1 | 2/2004 | Wosewick et al. |
| 2004/0049877 A1 | 3/2004 | Jones et al. |
| 2004/0187457 A1 | 9/2004 | Colens |
| 2005/0067994 A1 | 3/2005 | Jones et al. |
| 2005/0204717 A1 | 9/2005 | Colens |
| 2005/0251292 A1 * | 11/2005 | Casey et al. ............ 700/245 |
| 2007/0192910 A1 * | 8/2007 | Vu et al. ................. 901/17 |
| 2007/0198128 A1 * | 8/2007 | Ziegler et al. .......... 700/245 |
| 2007/0199108 A1 * | 8/2007 | Angle et al. ............ 901/17 |
| 2007/0266508 A1 | 11/2007 | Jones et al. |
| 2008/0015738 A1 * | 1/2008 | Casey et al. ............ 700/258 |
| 2008/0016631 A1 * | 1/2008 | Casey et al. ............ 15/3 |
| 2008/0307590 A1 | 12/2008 | Jones et al. |
| 2009/0045766 A1 * | 2/2009 | Casey et al. ............ 318/568.16 |
| 2009/0055022 A1 | 2/2009 | Casey et al. |
| 2009/0177323 A1 * | 7/2009 | Ziegler et al. .......... 700/259 |
| 2009/0292393 A1 * | 11/2009 | Casey et al. ............ 700/245 |
| 2010/0049365 A1 | 2/2010 | Jones et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2011/0172822 A1 * | 7/2011 | Ziegler et al. .......... 700/259 |
| 2012/0303160 A1 * | 11/2012 | Ziegler et al. .......... 700/259 |
| 2014/0095007 A1 * | 4/2014 | Angle et al. ............ 701/23 |

\* cited by examiner

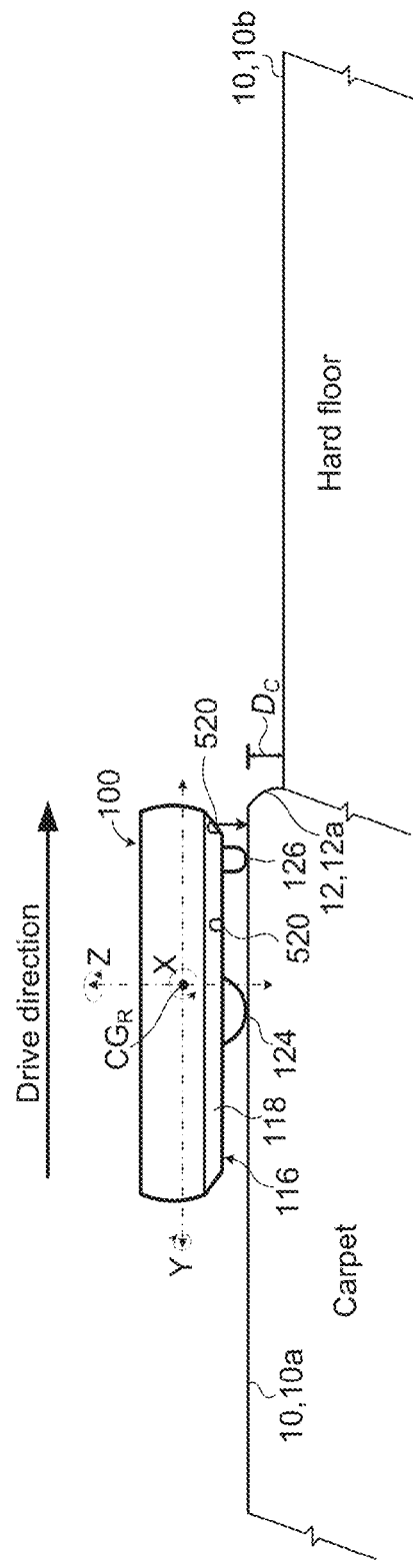

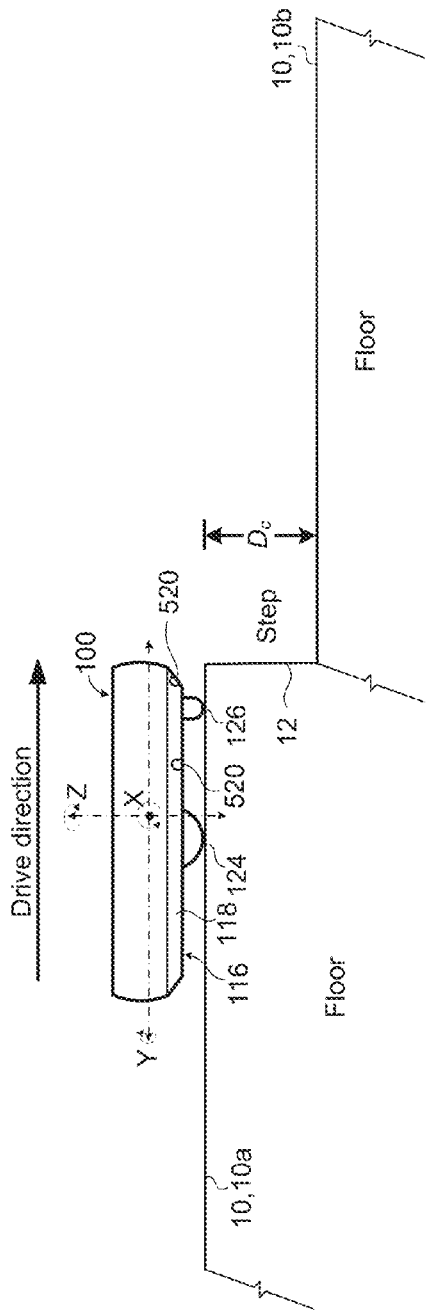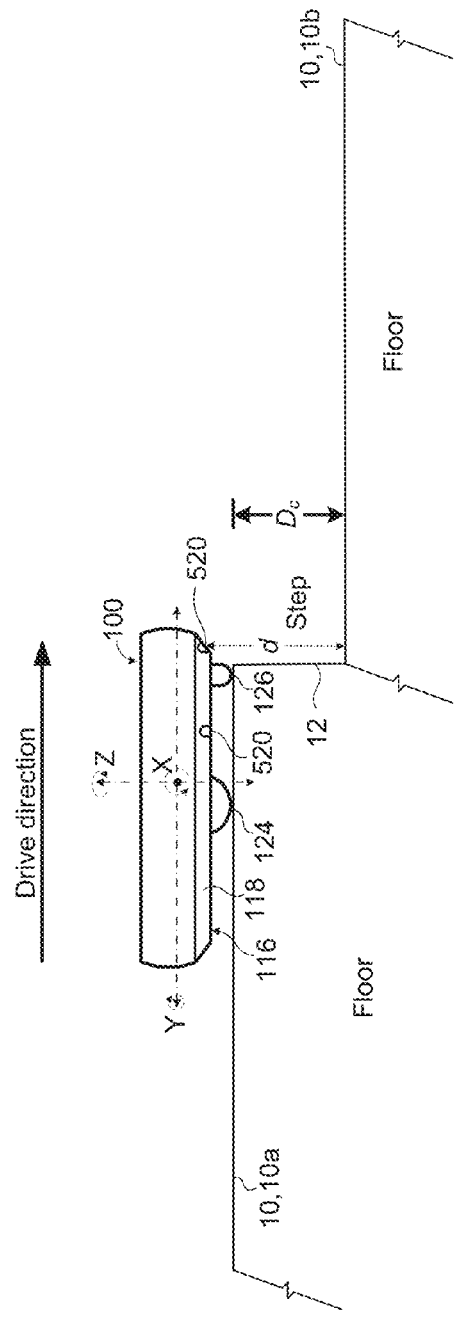

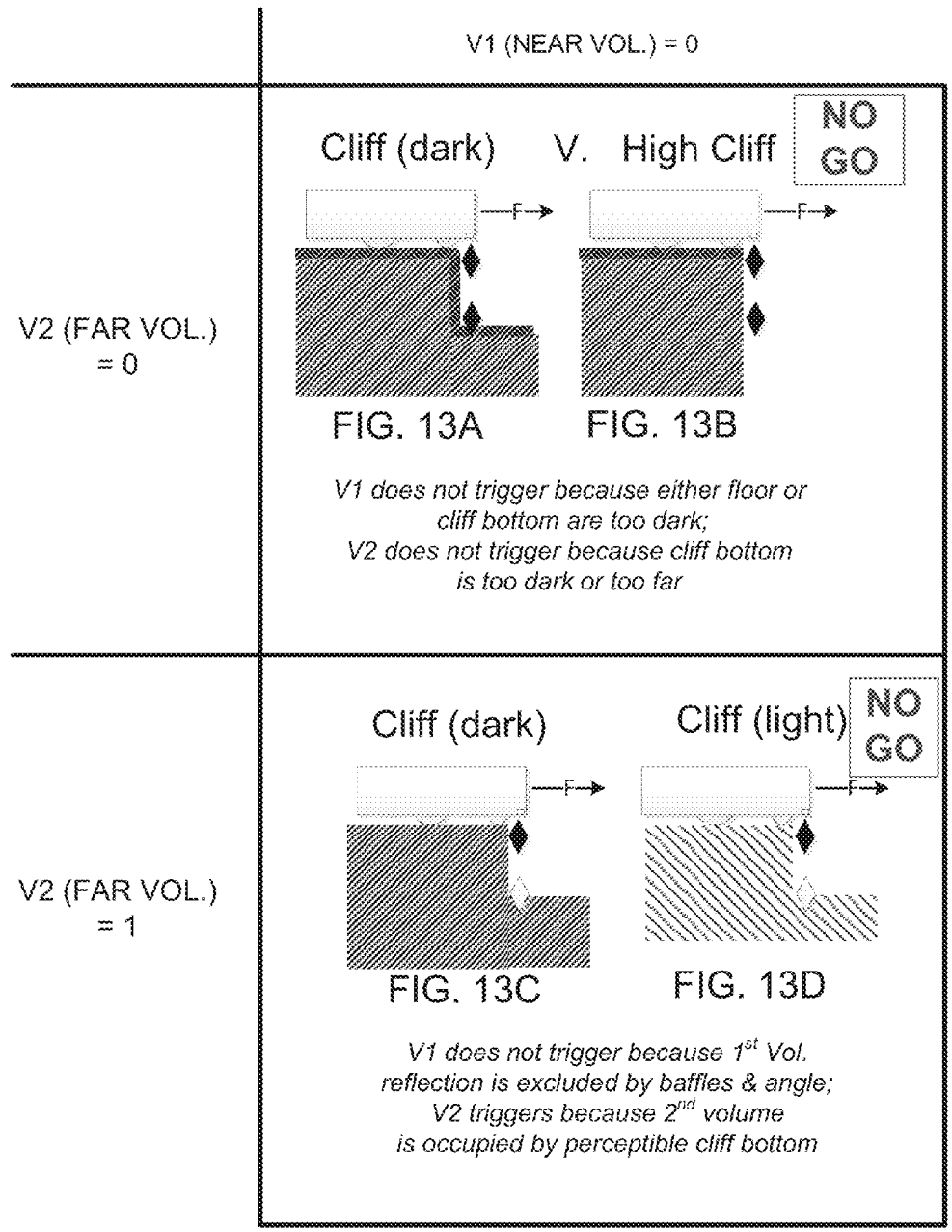

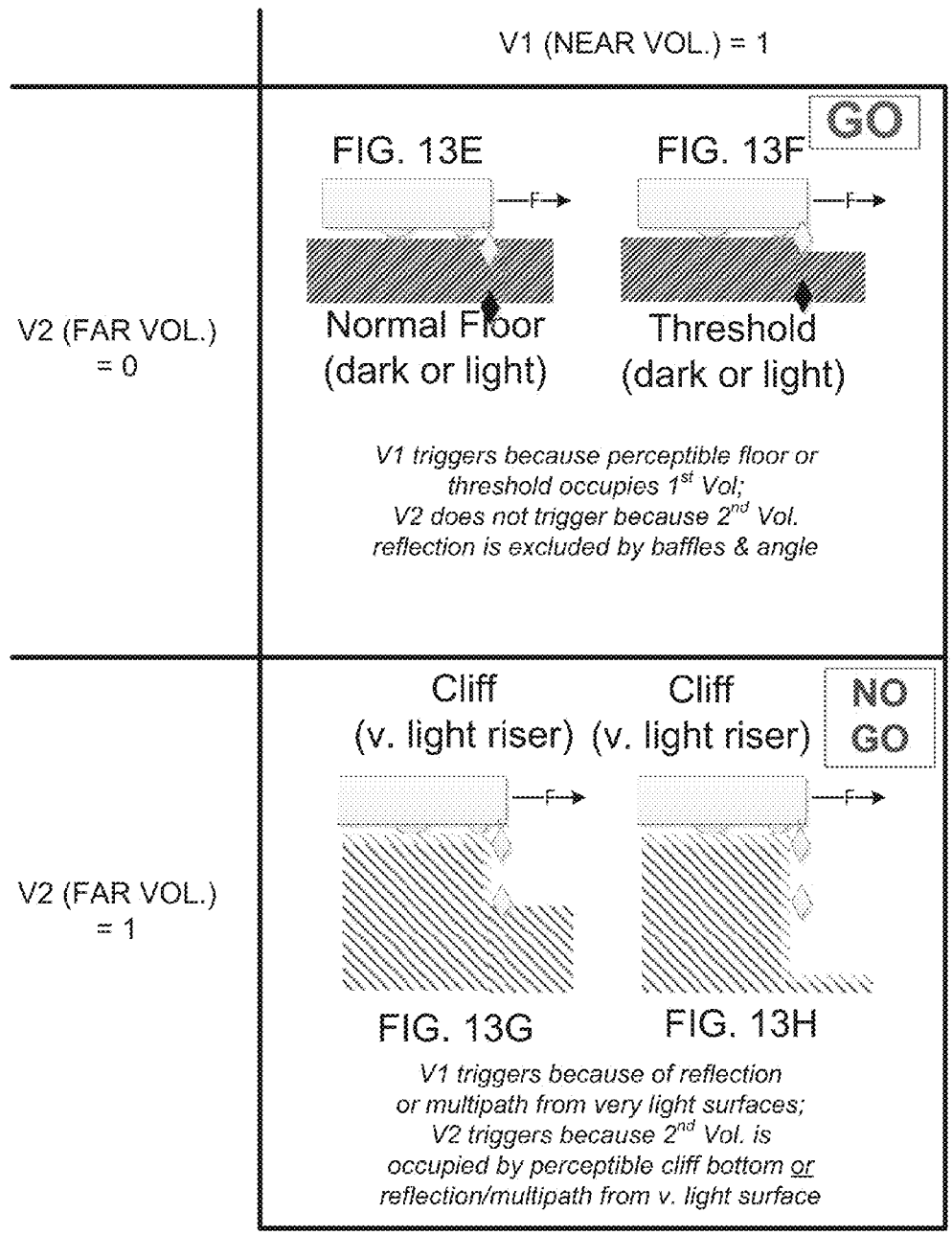

PROXIMITY SENSING ON MOBILE ROBOTS

CROSS REFERENCE TO RELATED APPLICATIONS

This U.S. patent application claims priority under 35 U.S.C. §119(e) to U.S. Provisional Application 61/704,419, filed on Sep. 21, 2012, which is hereby incorporated by reference in its entirety.

TECHNICAL FIELD

This disclosure relates to proximity sensors for mobile robots.

BACKGROUND

A vacuum cleaner generally uses an air pump to create a partial vacuum for lifting dust and dirt, usually from floors, and optionally from other surfaces as well. The vacuum cleaner typically collects dirt either in a dust bag or a cyclone for later disposal. Vacuum cleaners, which are used in homes as well as in industry, exist in a variety of sizes and models, such as small battery-operated hand-held devices, domestic central vacuum cleaners, huge stationary industrial appliances that can handle several hundred liters of dust before being emptied, and self-propelled vacuum trucks for recovery of large spills or removal of contaminated soil.

Autonomous robotic vacuum cleaners generally navigate, under normal operating conditions, a floor surface of a living space while vacuuming the floor. Autonomous robotic vacuum cleaners generally include sensors that allow it to avoid obstacles, such as walls, furniture, or stairs. The robotic vacuum cleaner may alter its drive direction (e.g., turn or back-up) when it bumps into an obstacle. The robotic vacuum cleaner may also alter drive direction or driving pattern upon detecting exceptionally dirty spots on the floor.

SUMMARY

One aspect of the disclosure provides a proximity sensor that includes a sensor body, a first emitter housed by the sensor body, a second emitter housed by the sensor body adjacent to the first emitter, and a receiver disposed adjacent the first emitter opposite the second emitter. The first emitter has a first field of view, the second emitter has a second field of view, and the receiver has a third field of view. An intersection of the first and third field of views defines a first volume; and an intersection of the second and third fields of view defines a second volume. The first volume detects a first surface within a first threshold distance from a sensing reference point and the second volume detects a second surface within a second threshold distance from the sensing reference point. The second threshold distance is greater than the first threshold distance.

Implementations of the disclosure may include one or more of the following features. In some implementations, the first and second emitters and the receiver define a respective field of view axis and the sensor body defines a transverse axis and a longitudinal axis. The first and second emitters and the receiver are disposed along the transverse axis with their field of view axes arranged at an angle with respect to the longitudinal axis. The field of view of one of the first and second emitters and the receiver are arranged at an angle of between 0 and about 10 degrees with respect to the longitudinal axis of the sensor body. The sensor body includes at least one wall arranged to define the field of view of at least one of the first emitter, the second emitter, or the receiver. In some examples, the first threshold distance equals between about 1 inch and about 3 inches. Additionally or alternatively, the second threshold distance is greater than 3 inches.

One aspect of the disclosure provides a proximity sensor that includes a sensor body, and first, second, and third sensor components. The first and second sensor components are housed by the sensor body adjacent to one another. The first sensor component is either an emitter or a receiver. The second sensor component is either an emitter or a receiver; the second sensor component is not the same as the first sensor component. The third sensor component is disposed adjacent the second sensor opposite the first sensor. The third sensor component is an emitter if the second sensor is an emitter or a receiver if the second sensor is a receiver. The first sensor component has a first field of view, the second sensor component has a second field of view, and the third sensor component has a third field of view. The first field of view intersects the second field of view and the third field of view. The intersection of the first and second fields of view defines a first volume and the intersection of the first and third fields of view defines a second volume. The first volume detects a first surface within a first threshold distance from a sensing reference point and the second volume detects a second surface within a second threshold distance from the sensing reference point. The second threshold distance is greater than the first threshold distance.

In some implementations, each emitter emits infrared light and each receiver receives reflections of the emitted infrared light. The sensor body may include at least one wall arranged to define the field of view of at least one sensor component. Additionally or alternatively, a first distance between the first sensor component and the second sensor component is less than a second distance between the second sensor component and the third sensor component.

Each sensor component may define a field of view axis, and the sensor body may define a transverse axis and a longitudinal axis. The sensor components may be disposed along the transverse axis with their field of view axes arranged at an angle with respect to the longitudinal axis. The field of view axes of the second sensor component and the third sensor component may be parallel. Additionally or alternatively, field of view axes of the second sensor component and the third sensor component are each arranged at an angle of between 0 and about 10 degrees with respect to the longitudinal axis of the sensor body. The field of view axis of the first sensor component may be arranged at an angle between about 5 degrees and about 15 degrees with respect to the longitudinal axis. The angle of the field of view axis of the first sensor component may be greater than the angles of the field of view axes of the second and third sensor components.

In some examples, the first threshold distance equals between about 1 inch and about 10 inches. Additionally or alternatively, the second threshold distance may be greater than 10 inches.

Another aspect of the disclosure provides a method of sensing a proximity of an object. The method includes receiving, at a computing processor, data from a first sensor. The first sensor includes a first emitter and a first receiver. The method includes receiving, at the computing processor, data from a second sensor including a second emitter and a second receiver. The first emitter and the second emitter are the same emitter or the first receiver and the second receiver are the same receiver. The method includes determining, using the computing processor, a target distance between a sensing reference point and a sensed object based on the received data, and determining if the target distance is within a first threshold distance or a second threshold distance. The method also includes issuing a command, from the computing processor, based on whether the target distance is within the first threshold distance or the second threshold distance. In some examples, the processing time of the computing processor between determining if the target distance is within a first or a second threshold distance and issuing a command is equal to or less than about 8 milliseconds.

In some implementations, if the first emitter and the second emitter are the same, the method further includes emitting light from the first emitter along a first field of view, and receiving reflections of the light at the first receiver along a second field of view. In addition, the method includes receiving reflection of the light at the second receiver along a third field of view. The first field of view intersects the second and third fields of view. The intersection of the first and second fields of views defines a first volume, and the intersection of the first and third fields of view defines a second volume. The first volume detects a first surface within the first threshold distance from the sensing reference point, and the second volume detects a second surface within a second threshold distance from the sensing reference point. The second threshold distance is greater than the first threshold distance. The first, second, and third fields of view may define first, second, and third field of view axes respectively, where the second and the third field of view axes are parallel. Additionally or alternatively, the method may include arranging a field of view axis defined by the first field of view at an angle between about 5 degrees and about 15 degrees with respect to a common longitudinal sensing axis, and arranging field of view axes defined by the second and third fields of view at an angle of between 0 and about 10 degrees with respect to the common longitudinal sensing axis.

In some implementations, if the first receiver and the second receiver are the same, the method further includes receiving reflections of light along a first field of view, and emitting light from the first emitter along a second field of view. The method also includes emitting light from the second emitter along a third field of view. The first field of view intersects the second and third fields of view, where the intersection of the first and second fields of views defines a first volume. The intersection of the first and third fields of view defines a second volume. The first volume detects a first surface within the first threshold distance from the sensing reference point, and the second volume detects a second surface within a second threshold distance from the sensing reference point. The second threshold distance is greater than the first threshold distance. The first, second, and third fields of view define first, second, and third fields of view axes respectively, where the second and the third fields of view axes are parallel. Additionally or alternatively, the method may include arranging a field of view axis defined by the first field of view at an angle between about 5 degrees and about 15 degrees with respect to a common longitudinal sensing axis, and arranging field of view axes defined by the second and third fields of view at an angle of between 0 and about 10 degrees with respect to the common longitudinal sensing axis.

A first distance between the first emitter and the first receiver may be less than a second distance between the second emitter and the second receiver. The first threshold distance may equal between about 1 inch and about 10 inches and/or the second threshold distance is greater than 10 inches.

Another aspect of the disclosure provides an autonomous robot having a robot body, a drive system, a sensor system, and a controller. The robot body defines a forward drive direction. The drive system supports the robot body and is configured to maneuver the robot over a floor surface. The sensor system is disposed on the robot body and includes at least one proximity sensor. The proximity sensor includes a sensor body, and first second and third sensor components. The first and second sensor components are housed by the sensor body adjacent to one another. The first sensor component is one of an emitter and a receiver, and the second sensor component is the other one of an emitter and a receiver. The third sensor component is disposed adjacent the second sensor opposite the first sensor, and is an emitter if the second sensor is an emitter or a receiver if the second sensor is a receiver. The first sensor component has a first field of view, the second sensor component has a second field of view, and the third sensor component has a third field of view. The first field of view intersects the second field of view and the third field of view. The intersection of the first and second fields of view defines a first volume and the intersection of the first and third fields of view defines a second volume. The first volume detects a first surface within a first threshold distance from a sensing reference point and the second volume detects a second surface within a second threshold distance from the sensing reference point. The second threshold distance is greater than the first threshold distance. The controller is in communication with the drive system and the sensor system. The controller includes a computing processor processing data received from the sensor system and issues a command based on the received data. The sensor body may include at least one wall arranged to define a field of view of at least one sensor component.

In some examples, the robot includes two or more proximity sensors. The controller sequentially enables and disables each proximity sensor with a threshold period of time between disabling one sensor and enabling another sensor.

The controller may determine a target distance between a sensing reference point and a sensed object and issues a reverse drive command to the drive system if the target distance to the object is within the second threshold distance. The reverse drive command changes the direction of the robot from a forward drive direction to a reverse drive direction. Additionally or alternatively, a first distance between the first sensor component and the second sensor component is less than a second distance between the second sensor component and the third sensor component.

In some implementations, each sensor component defines a field of view axis, and the sensor body defines a transverse axis and a longitudinal axis. The sensor components are disposed along the transverse axis with their field of view axes arranged at an angle with respect to the longitudinal axis. The field of view axes of the second sensor component and the third sensor component may be parallel. The field of view axes of the second sensor component and the third sensor component may each be arranged at an angle of between 0 and about 10 degrees with respect to the longitudinal axis of the sensor body. Additionally or alternatively, the field of view axis of the first sensor component may be arranged at an angle between about 5 degrees and about 15 degrees with respect to the longitudinal axis. The angle of the field of view axis of the first sensor component may be greater than the angles of the field of view axes of the second and third sensor components. In some examples, the first threshold distance is about 1 to 10 inches and/or the second threshold distance is greater than 10 inches.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 6 is a side view of an exemplary autonomous mobile robot as it traverses a floor surface.

FIGS. 7A-7B are side views of an exemplary autonomous robot as it traverses a floor surface.

FIGS. 13A-13H are schematic views of a robot having an exemplary proximity sensor as it senses a surface at different heights.

Like reference symbols in the various drawings indicate like elements.

DETAILED DESCRIPTION

An autonomous robot movably supported can navigate a floor surface. In some examples, the autonomous robot can clean a surface while traversing the surface. The robot can remove debris from the surface by agitating the debris and/or lifting the debris from the surface by applying a negative pressure (e.g., partial vacuum) above the surface, and collecting the debris from the surface.

Figure 1:
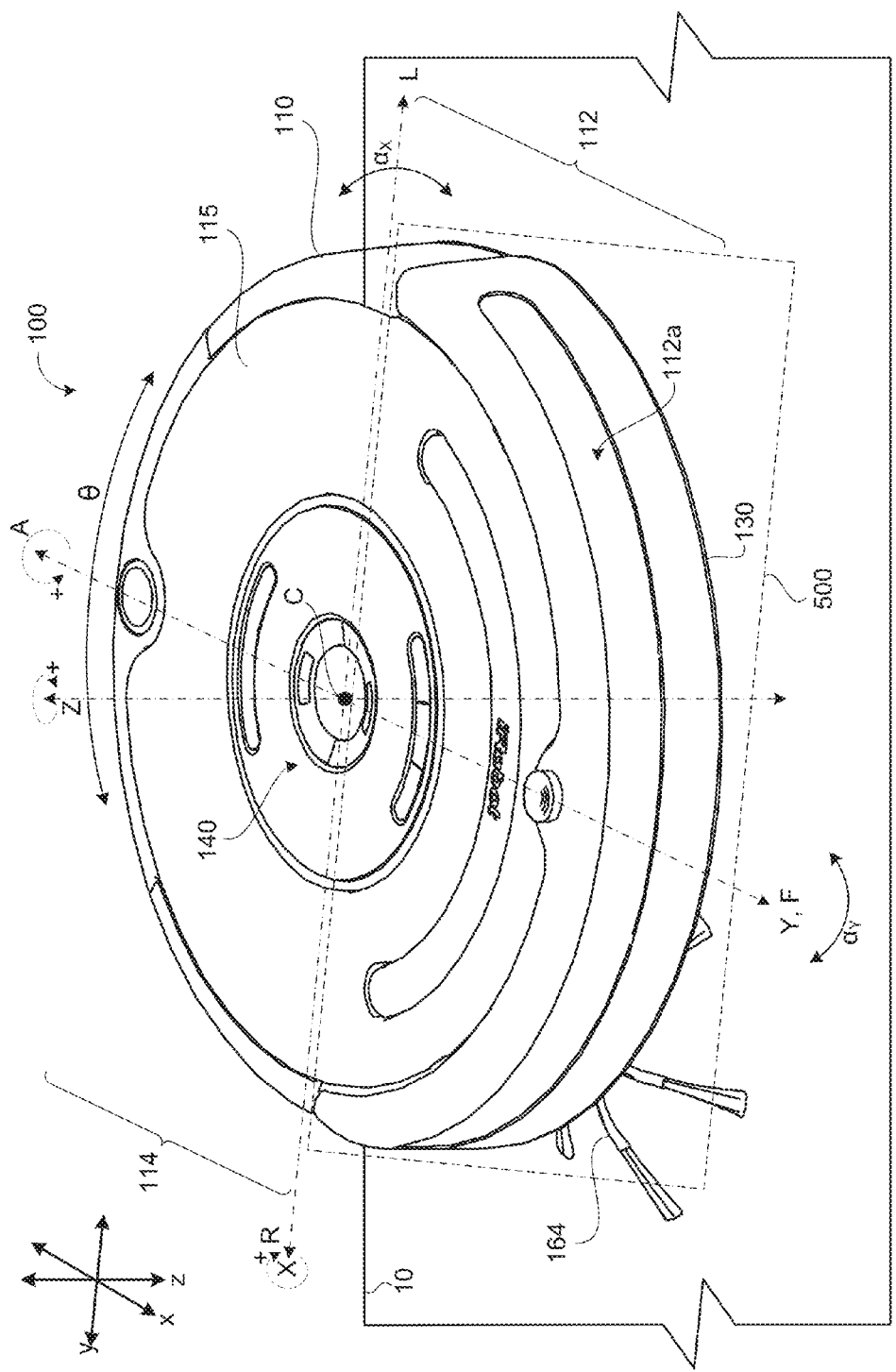
FIG. 1 is a perspective view of an exemplary autonomous mobile robot.
Figure 2:
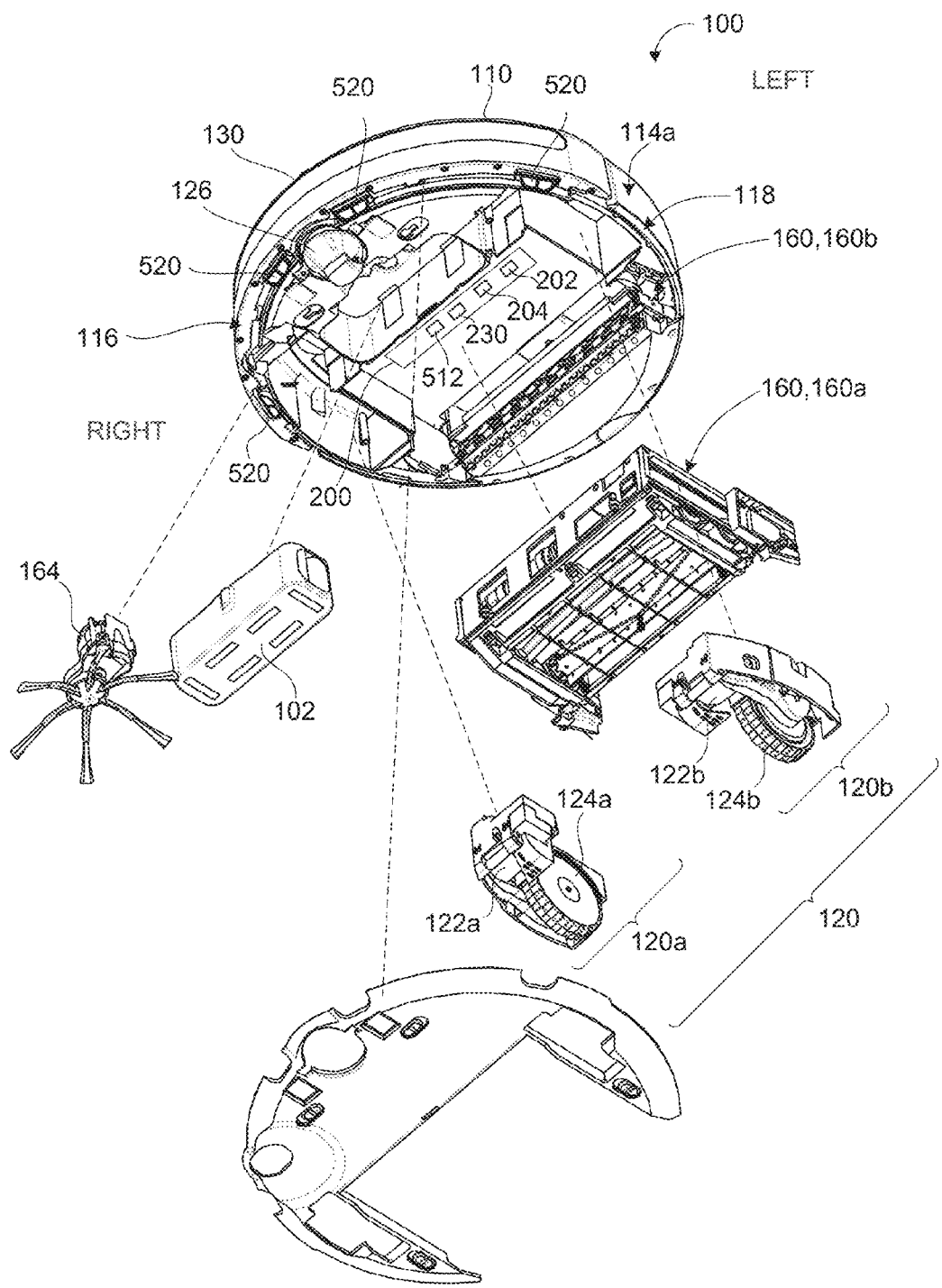
FIG. 2 is an exploded view of the robot shown in FIG. 1.
Figure 3:
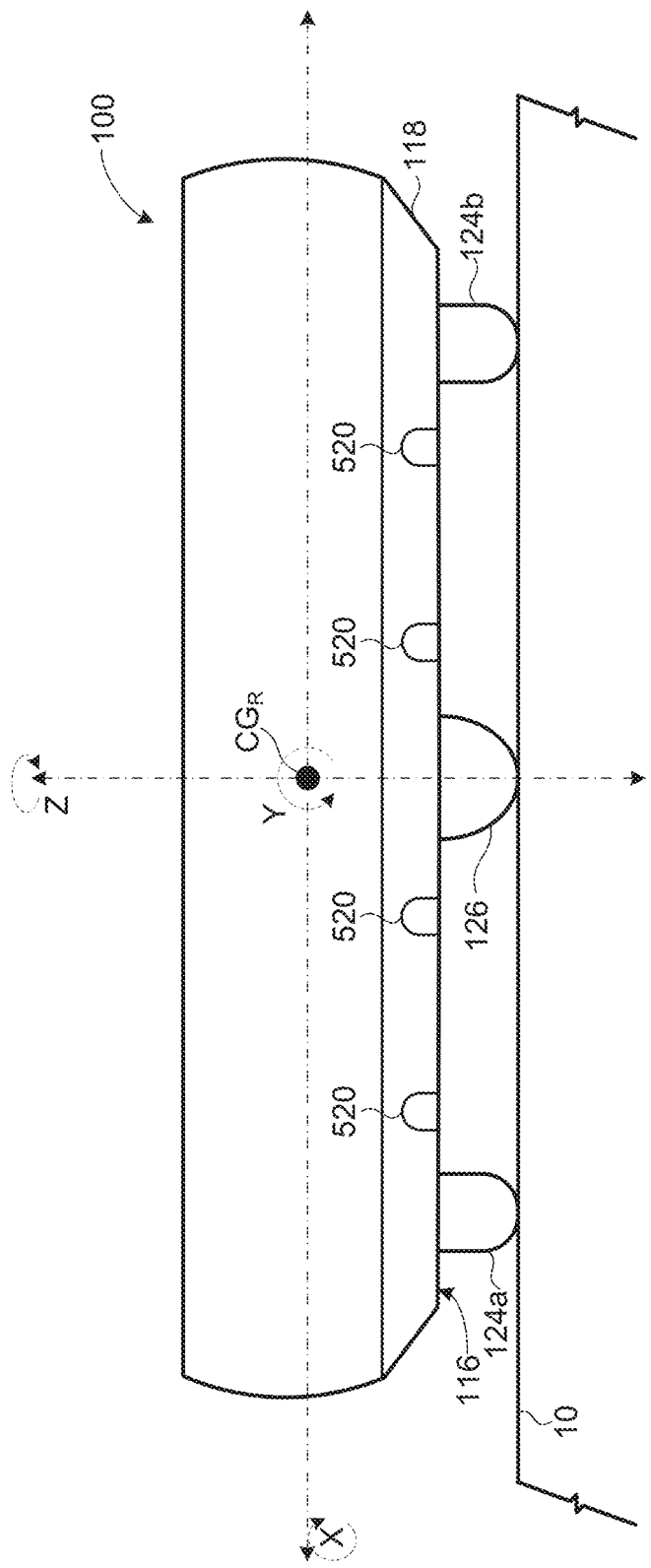
FIG. 3 is a front view of an exemplary autonomous mobile robot.

Referring to FIGS. 1-3, in some implementations, a robot 100 includes a body 110 supported by a drive system 120 that can maneuver the robot 100 across a floor surface 10 based on a drive command having x, y, and θ components, for example. The robot body 110 has a forward portion 112 and a rearward portion 114. As shown, the robot body 110 has a circular shape, but may have other shapes including, but not limited to, a square shape, a rectangular shape, or a combination where the forward portion 112 is square and the rearward portion 114 is round or vice versa. The drive system 120 includes right and left driven wheel modules 120a, 120b. The wheel modules 120a, 120b are substantially opposed along a transverse axis X defined by the body 110 and include respective drive motors 122a, 122b driving respective wheels 124a, 124b. The drive motors 122a, 122b may releasably connect to the body 110 (e.g., via fasteners or tool-less connections) with the drive motors 122a, 122b optionally positioned substantially over the respective wheels 124a, 124b. The wheel modules 120a, 120b can be releasably attached to the robot body 110 and spring biased into engagement with the floor surface 10. In some examples, the wheels 124a, 124b are releasably connected to the wheel modules 120a, 120b. The wheels 124a, 124b may have a biased-to-drop suspension system, which improves traction of the wheel modules 120a, 120b over slippery floors (e.g., hardwood, wet floors). In some examples, the wheel modules 120a, 120b are movably secured (e.g., rotatably attach) to the robot body 110 and receive spring biasing (e.g., between about 5 and 25 Newtons) that biases the drive wheels 124a, 124b downward and away from the robot body 110. For example, the drive wheels 124a, 124b may receive a downward bias of about 10 Newtons when moved to a deployed position and about 20 Newtons when moved to a retracted position into the robot body 110. The spring biasing allows the drive wheels 124a, 124b to maintain contact and traction with the floor surface 10 while any cleaning elements of the robot 100 contact the floor surface 10 as well. The robot 100 may include a caster wheel 126 disposed to support a forward portion 112 of the robot body 110. The caster wheel 126 can be releasably attached to the body 110 and spring biased into engagement with the floor surface 10. The robot body 110 supports a power source 102 (e.g., a battery) for powering any electrical components of the robot 100.

The robot 100 can move across a floor surface 10 through various combinations of movements relative to three mutually perpendicular axes defined by the body 110: a transverse axis X, a fore-aft axis Y, and a central vertical axis Z. A forward drive direction along the fore-aft axis Y is designated F (sometimes referred to hereinafter as "forward"), and an aft drive direction along the fore-aft axis Y is designated A (sometimes referred to hereinafter as "rearward"). The transverse axis X extends between a right side R and a left side L of the robot 100 substantially along an axis defined by center points of the wheel modules 120a, 120b.

The robot 100 can tilt about the X axis. When the robot 100 tilts to the south position, it tilts towards the rearward portion 114 (sometimes referred to hereinafter as "pitched up"), and when the robot 100 tilts to the north position, it tilts towards the forward portion 112 (sometimes referred to hereinafter as "pitched down"). Additionally, the robot 100 tilts about the Y axis. The robot 100 may tilt to the east of the Y axis (sometimes referred to hereinafter as a "right roll"), or the robot 100 may tilt to the west of the Y axis (sometimes referred to hereinafter as a "left roll"). Therefore, a change in the tilt of the robot 100 about the X axis is a change in its pitch about a pitch angle $\alpha_Y$, and a change in the tilt of the robot 100 about the Y axis is a change in its roll about a roll angle $\alpha_Y$. In addition, the robot 100 may either tilt to the right, i.e., an east position, or to the left i.e., a west position. In some examples the robot 100 tilts about the X axis and about the Y axis having tilt positions, such as northeast, northwest, southeast, and southwest. As the robot 100 is traversing a floor surface 10, the robot 100 may make a left or right turn about its Z axis (sometimes referred to hereinafter as a "change in the yaw"). A change in the yaw causes the robot 100 to make a left turn or a right turn while it is moving. Thus, the robot 100 may have a change in one or more of its pitch, roll, or yaw at the same time. The robot 100 may tilt in a combination tilt about the X axis and the Y axis, i.e., the robot 100 may pitch and roll. The total tilt angle $\alpha_T$ is the summation of vectors of each tilt about the X axis and the Y axis. Therefore, if the robot 100 is only pitched, then the total tilt angle $\alpha_T$ equals the pitched angle. Similarly, if the robot 100 is only rolled, then the total tilt angle $\alpha_T$ equals the roll angle.

The forward portion 112 of the body 110 may carry a bumper 130, which detects (e.g., via a sensor system 500) one or more events in a drive path of the robot 100, for example, as the wheel modules 120a, 120b propel the robot 100 across the floor surface 10 during a cleaning routine. The robot 100 may respond to events (e.g., obstacles, cliffs 12, walls) detected by the bumper 130 by controlling the wheel modules 120a, 120b to maneuver the robot 100 in response to the event (e.g., away from an obstacle). The sensor system 500 may be arranged on the bumper 130, or may additionally or alternatively be arranged at any of various different positions on the robot 100.

The robot 100 may include a cleaning system 160 for cleaning or treating a floor surface 10. The cleaning system 160 may include a dry cleaning system 160a and/or a wet cleaning system 160b. The cleaning system 160 may also include a side brush 164 having an axis of rotation at an angle with respect to the floor surface 10 for moving debris into a cleaning swath area of the cleaning system 160.

A user interface 140 disposed on a top portion 115 of the body 110 receives one or more user commands and/or displays a status of the robot 100. The user interface 140 is in communication with a robot controller 200 carried by the robot 100 such that one or more commands received by the user interface 140 can initiate execution of a routine by the robot 100. The controller 200 includes a computing processor 202 (e.g., central processing unit) in communication with non-transitory memory 204 (e.g., a hard disk, flash memory, random-access memory).

Figure 4:
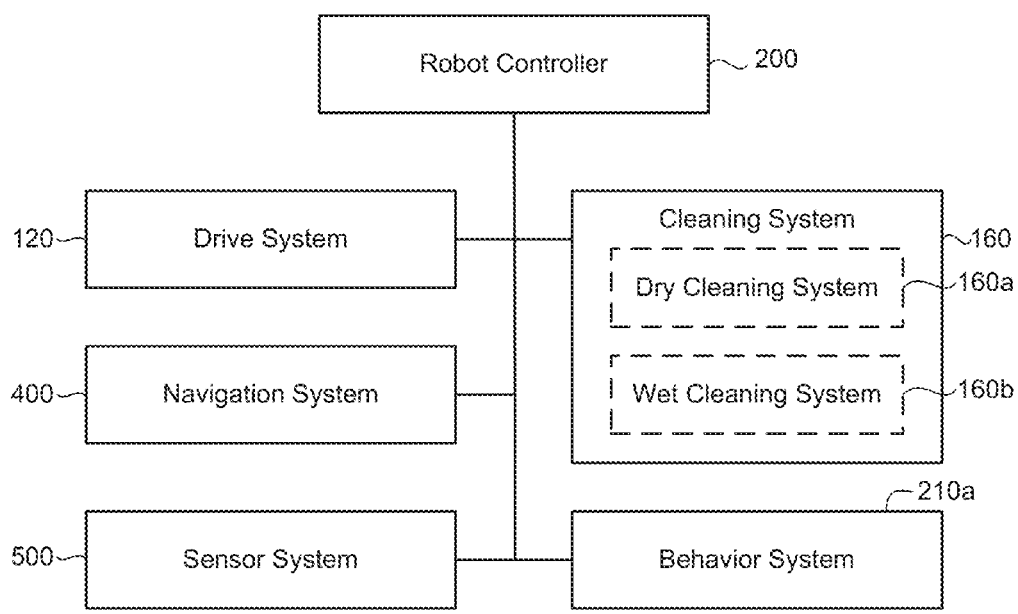
FIG. 4 is a schematic view of an exemplary autonomous mobile robot.
Figure 5:
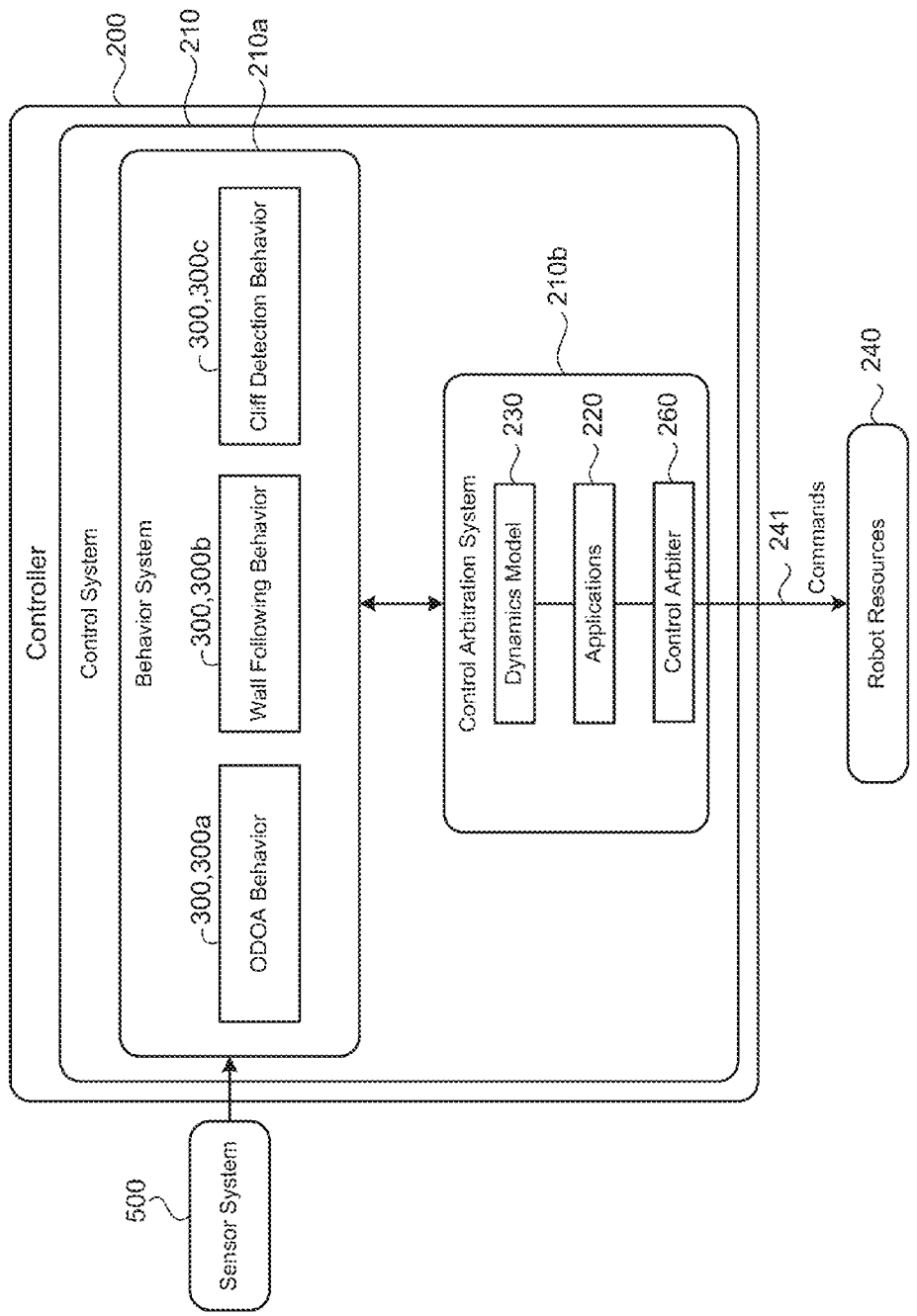
FIG. 5 is a schematic view of an exemplary controller for an autonomous mobile robot.

Referring to FIGS. 4 and 5, the robot controller 200 (executing a control system) may execute behaviors 300 that cause the robot 100 to take an action, such as maneuvering in a wall following manner, a floor scrubbing manner, or changing its direction of travel when an obstacle is detected. The robot controller 200 can maneuver the robot 100 in any direction across the cleaning surface by independently controlling the rotational speed and direction of each wheel module 120a, 120b. For example, the robot controller 200 can maneuver the robot 100 in the forward F, reverse (aft) A, right R, and left L directions.

To achieve reliable and robust autonomous movement, the robot 100 may include a sensor system 500 having several different types of sensors, which can be used in conjunction with one another to create a perception of the robot's environment sufficient to allow the robot 100 to make intelligent decisions about actions to take in that environment. The sensor system 500 may include one or more types of sensors supported by the robot body 110, which may include obstacle detection obstacle avoidance (ODOA) sensors, communication sensors, navigation sensors, etc. For example, these sensors may include, but not limited to, proximity sensors 520, contact sensors, a camera (e.g., volumetric point cloud imaging, three-dimensional (3D) imaging or depth map sensors, visible light camera and/or infrared camera), sonar, radar, LIDAR (Light Detection and Ranging, which can entail optical remote sensing that measures properties of scattered light to find range and/or other information of a distant target), LADAR (Laser Detection and Ranging), etc.

In some examples, the sensor system 500 includes an inertial measurement unit (IMU) 512 in communication with the controller 200 to measure and monitor a moment of inertia of the robot 100 with respect to the overall center of gravity $CG_R$ (FIGS. 1, 6) of the robot 100. The controller 200 may monitor any deviation in feedback from the IMU 512 from a threshold signal corresponding to normal unencumbered operation. For example, the controller 200 monitors the total tilt angle $\alpha_T$ and when the total title angle $\alpha_T$ is above a threshold tilt angle, the controller 200 may determine that the robot 100 is heading towards a cliff 12 and executes a stop command to stop the robot 100 from falling off the cliff 12. The controller 200 executes a rotate or back up command allowing the robot 100 to move away from the cliff 12.

The IMU 512 may measure and monitor a moment of inertia of the robot 100 based on relative values. In some implementations, and over a period of time, constant movement may cause the IMU to drift. The controller 200 executes a resetting command to recalibrate the IMU 512 and reset it to zero. Before resetting the IMU 512, the controller 200 determines if the robot 100 is tilted, and issues the resetting command only if the robot 100 is on a flat surface.

In some implementations, the robot 100 includes a navigation system 400 configured to allow the robot 100 to navigate the floor surface 10 without colliding into obstacles or falling down stairs, and to intelligently recognize relatively dirty floor areas for cleaning. Moreover, the navigation system 400 can maneuver the robot 100 in deterministic and pseudo-random patterns across the floor surface 10. The navigation system 400 may be a behavior based system stored and/or executed on the robot controller 200. The navigation system 400 may communicate with the sensor system 500 to determine and issue drive commands 241 to the drive system 120. The navigation system 400 influences and configures the robot behaviors 300, thus allowing the robot 100 to behave in a systematic preplanned movement. In some examples, the navigation system 400 receives data from the sensor system 500 and plans a desired path for the robot 100 to traverse.

In some implementations, the controller 200 (e.g., a device having one or more computing processors 202 in communication with non-transitory memory 204 capable of storing instructions executable on the computing processor(s)) executes a control system 210, which includes a behavior system 210a and a control arbitration system 210b in communication with each other. The control arbitration system 210b allows robot applications 220 to be dynamically added and removed from the control system 210, and facilitates allowing applications 220 to each control the robot 100 without needing to know about any other applications 220. In other words, the control arbitration system 210b provides a simple prioritized control mechanism between applications 220 and resources 240 of the robot 100.

The applications 220 can be stored in memory or communicated to the robot 100, to run concurrently (e.g., on a processor) and simultaneously control the robot 100. The applications 220 may access behaviors 300 of the behavior system 210a. The independently deployed applications 220 are combined dynamically at runtime and to share robot resources 240 (e.g., drive system 120 and/or cleaning systems 160, 160a, 160b). A low-level policy is implemented for dynamically sharing the robot resources 240 among the applications 220 at run-time. The policy determines which application 220 has control of the robot resources 240 as needed by that application 220 (e.g. a priority hierarchy among the applications 220). Applications 220 can start and stop dynamically and run completely independently of each other. The control system 210 also allows for complex behaviors 300, which can be combined together to assist each other.

The control arbitration system 210b includes one or more application(s) 220 in communication with a control arbiter 260. The control arbitration system 210b may include components that provide an interface to the control arbitration system 210b for the applications 220. Such components may abstract and encapsulate away the complexities of authentication, distributed resource control arbiters, command buffering, coordinate the prioritization of the applications 220 and the like. The control arbiter 260 receives commands from every application 220, generates a single command based on the applications' priorities and publishes it for its associated resources 240. The control arbiter 260 receives state feedback from its associated resources 240 and may send it back up to the applications 220. The robot resources 240 may be a network of functional modules (e.g., actuators, drive systems, and groups thereof) with one or more hardware controllers. The commands 241 of the control arbiter 260 are specific to the resource 240 to carry out specific actions. A dynamics model 230 executable on the controller 200 is configured to compute the center of gravity (CG), moments of inertia, and cross products of inertia of various portions of the robot 100 for assessing a current robot 100 state.

In some implementations, a behavior 300 is a plug-in component that provides a hierarchical, state-full evaluation function that couples sensory feedback from multiple sources, such as the sensor system 500, with a-priori limits and information into evaluation feedback on the allowable actions of the robot 100. Since the behaviors 300 are pluggable into the application 220 (e.g. residing inside or outside of the application 220), they can be removed and added without having to modify the application 220 or any other part of the control system 210. Each behavior 300 is a standalone policy. To make behaviors 300 more powerful, it is possible to attach the output of multiple behaviors 300 together into the input of another so that you can have complex combination functions. The behaviors 300 are intended to implement manageable portions of the total cognizance of the robot 100.

In the example shown, the behavior system 210a includes an obstacle detection/obstacle avoidance (ODOA) behavior 300a for determining responsive robot actions based on obstacles perceived by the sensor (e.g., turn away; turn around; stop before the obstacle, etc.). Another behavior 300 may include a wall following behavior 300b for driving adjacent a detected wall (e.g., in a parallel direction to the wall or in a wiggle pattern of driving toward and away from the wall). Other behaviors 300 may include a cliff detection behavior 300c (e.g., the robot detects stairs and avoids falling from the stairs).

Referring to FIGS. 3 and 6, in some implementations, the robot 100 (i.e., sensor system 500) includes one or more cliff proximity sensors 520 arranged near or about the bottom portion 116 of the forward portion 112 of the robot body 110. In some examples, the bottom portion 116 of the robot 100 includes a rim 118. The rim 118 connects the bottom portion 116 of the robot 100 and the forward and rearward peripheries 112a, 114a of the robot body 110. The rim 118 may have a frustoconical shape with the smaller diameter being the diameter of the bottom portion 116 of the robot body 110 and expanding to connect with the forward and rearward portions 112, 114 of the robot body 110. The cliff proximity sensors 520 can detect when the robot 100 has encountered a falling cliff 12 of the floor 10, such as when it encounters a set of stairs or a change in the height of the floor surface 10. The controller 200 (executing a control system) may execute behaviors that cause the robot 100 to take an action, such as changing its direction of travel, when a cliff 12 is detected. In some implementations, the sensor system 500 includes one or more secondary cliff sensors (e.g., other sensors configured for cliff sensing and optionally other types of sensing). The cliff detecting proximity sensors 520 can be arranged to provide early detection of cliffs 12, provide data for discriminating between actual cliffs 12b—where the robot 100 is not able to traverse (e.g., stairs with vertical stair risers)—and events (such as climbing over thresholds or traversing over a traversable cliff or traversable threshold 12a where the robot 100 may move between a first surface 10a and a second surface 10b that are separated by the traversable threshold 12a, and sometimes the robot 100 may move between the second surface 10b towards the first surface 10a), and may be positioned down and out so that their field of view 523, 525 (FIG. 8D) includes at least part of the robot body 110 and an area away from the robot body 110. In some implementations, the controller 200 executes a cliff detection routine that identifies and detects an edge of the supporting floor surface 10, an increase in distance past the edge of the floor surface 10, and/or an increase in distance between the robot body 110 and the floor surface 10. This implementation allows: 1) early detection of potential cliffs (which may allow faster mobility speeds in unknown environments); 2) increased reliability of autonomous mobility since the controller 200 receives cliff imaging information from the cliff detecting sensors 520 to know if a cliff event is truly an actual cliff 12b, in which case the robot 100 should stop moving, or if a floor surface 10 having a traversable threshold 12a may be traversed (e.g., such as climbing up and over a threshold); 3) a reduction in false positives of cliffs (e.g., due to the determination of the distance between the robot 100 and the floor surface 10 and a change in that distance, and having two detection zones). Additional sensors arranged as "wheel drop" sensors can be used for redundancy and for detecting situations where a range-sensing camera cannot reliably detect a certain type of cliff.

Threshold and step detection allows the robot 100 to effectively plan for either traversing a climb-able threshold or a traversable threshold 12a or avoiding an actual cliff 12b that is too tall. This can be the same for random objects on the floor surface 10 that the robot 100 may or may not be able to traverse. For those obstacles or thresholds that the robot 100 determines it can climb, knowing their height allows the robot 100 to slow down appropriately, if deemed needed, to allow for a smooth transition in order to maximize smoothness and minimize any instability due to sudden accelerations. In some implementations, threshold and step detection is based on object height above the floor surface 10 along with geometry recognition (e.g., discerning between a threshold or an electrical cable versus a blob, such as a sock). Thresholds may be recognized by edge detection. The controller 200 may receive imaging data from the cliff proximity sensors 520 (or another imaging sensor on the robot 100), execute an edge detection routine, and issue a drive command based on results of the edge detection routine. Threshold detection allows the robot 100 to change its orientation with respect to the threshold to maximize smooth step climbing and descent ability. The proximity sensors 520 may function alone, or as an alternative, may function in combination with one or more contact sensors (e.g., bump switches) for redundancy.

In some examples, the proximity sensors 520 are located on the rim 118 between the caster wheel 126 and each of the drive wheels 124a, 124b, so as to allow cliff detection before the caster wheel 126 encounters a cliff (e.g., stairs). In some cases, cliff sensing is implemented using infrared (IR) proximity or actual range sensing, using an infrared emitter 522 and an infrared detector 524 angled toward each other so as to have an overlapping emission and detection fields, and hence a detection zone V1, V2, at a location where a floor surface 10 is expected. IR proximity sensing can have a relatively narrow field of view, may depend on surface albedo for reliability, and can have varying range accuracy from surface to surface. As a result, multiple discrete sensors 520 can be placed about the perimeter of the robot 100 to adequately detect cliffs 12 from multiple points on the robot 100. Moreover, IR proximity based sensors typically cannot discriminate between an actual cliff 12b and a flooring surface or a traversable threshold 12a within a threshold drop distance, such as a doorway threshold.

Referring to FIG. 6, in some examples, a robot 100 is moving in a forward drive direction F. The proximity sensor 520 detects a cliff 12 or a change in the height (e.g., a drop distance $D_C$) of the floor surface 10 it is traversing, for example a first floor surface 10a (e.g., a carpet floor surface) to a second floor surface 10b (e.g., hardwood floor surface or a tile surface). The robot 100 determines that such a height difference is within a threshold drop distance $D_S$ (discussed in more detail below), and the robot 100 may easily navigate between the floor surfaces 10.

FIGS. 7A and 7B show the robot 100 as it moves along the first floor surface 10a and approaches a cliff 12 to a second floor surface 10b. The drop distance $D_C$ separates the first floor surface 10a from the second floor surface 10b. The robot 100 determines if the distance d between the robot 100 (i.e., a sensing point P along the bottom surface of the robot sensor 520) and the second floor surface 10b is within a threshold distance $D_S$, and if so, the robot 100 drives to the second floor surface 10d. In some examples, the robot 100 may drive back to the first floor surface 10a, if the distance d is within the threshold drop distance $D_S$. If not, the robot 100 drives on the second floor surface 10b.

FIGS. 8A-8D describe a differential distance measuring class of a three element proximity sensor (hereinafter "differential measuring class"), where different optical path length is used to self-calibrate for albedo and permit signal strength to be used for measuring distance. Within this class, two elements of one kind and one of the remaining kind are used for different implementations (two emitters with one receiver; or two receivers with one emitter). In some examples, the proximity sensors 520 measure the distance D to the surface floor 10. This allows the mobile robot 100 to navigate intelligently and efficiently in an environment by detecting and avoiding obstacles, cliffs 12 etc. Performance of the proximity sensors 520 may depend on the surface characteristics of the object (i.e., floor surface 10). Some proximity sensors 520 have unacceptable performance on darker, less reflective surfaces. In some examples, an emitter 522 and detector pair 524a, 524b, oriented such that their field of emission 523 and field of view 525 overlap fully or almost fully near the expected floor surface 10 while having only a minimal overlap (that decreases as distance to the surface increases) or no overlap at farther surfaces, can be used to work well on a majority of surfaces (as shown in FIGS. 8A-8D). The emitter 522 may be modulated to reject ambient light and other sources.

Figure 8A:
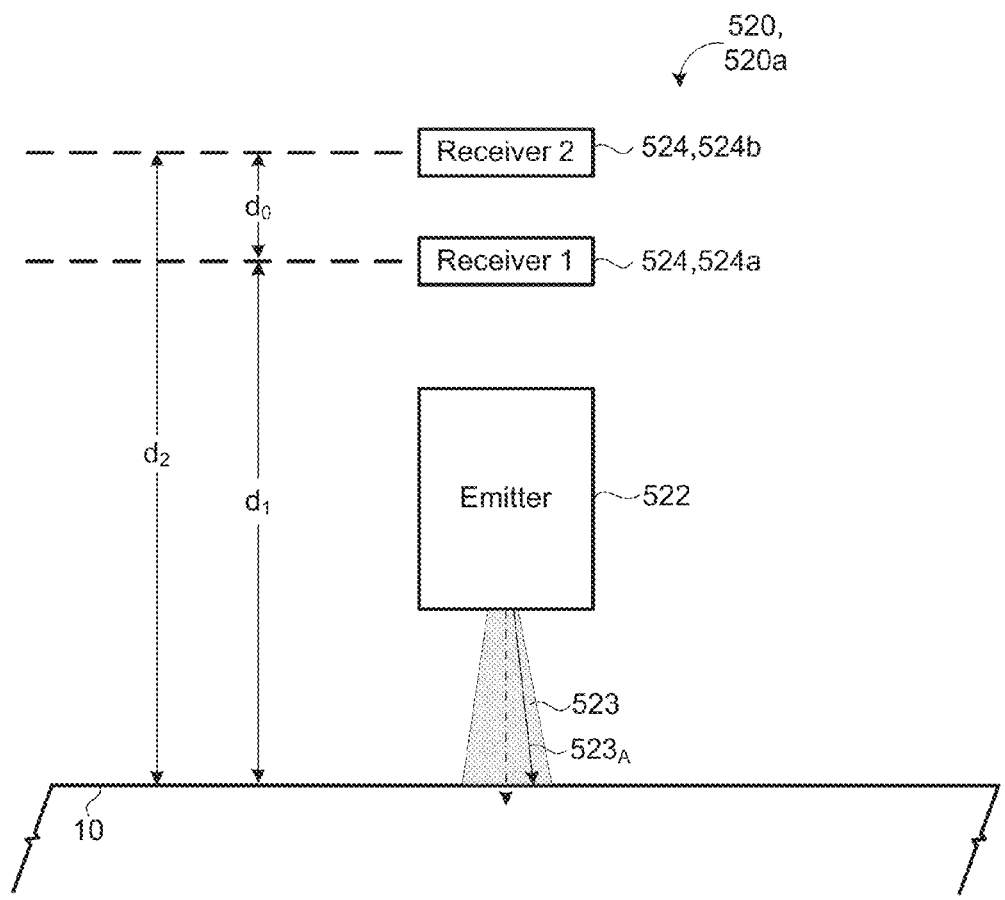
FIGS. 8A-8C are side schematic views of exemplary proximity sensors.

Referring to FIG. 8A, the proximity sensor 520 measures a distance $d_1$, $d_2$ to the floor surface 10. The proximity sensors 520 may be a differential optical sensor 520a and includes an emitter 522 that shines a beam of light $523_A$ on the floor surface 10. Most of the floor surfaces 10 are more or less lambertian and diffuse the incident light 523 into a spherical wavefront. As a result, the amount of energy E collected by the receivers 524 is inversely proportional to the square of the distance $d_1$, $d_2$ from the receiver 524 to the surface. Furthermore, the field of view 525 of receivers is designed to include the spot created by the emitter 522 and overlap as much as possible up to an infinite distance. The energy $E_1$, $E_2$ received by both receivers 524a, 524b is proportional to the same amount of reflected energy L. The energy $E_i$ collected by the receivers 524a, 524b can be calculated using the following equation:

$$E_1 = g_1 \frac{L}{d_1^2} \quad \text{(Eq. 1)}$$

$$E_2 = g_2 \frac{L}{d_2^2} \quad \text{(Eq. 2)}$$

where $E_i$ is the energy collected by the receivers, $g_i$ is the gain of each receiver 524a, 524b, L is the energy reflected by the surface 10, and $d_i$ is the distance to the receiver 524a, 524b.

Taking the ratio R of the measurements, we get:

$$R = \frac{E_1}{E_2} \quad \text{(Eq. 3)}$$

$$= \frac{g_1 \frac{L}{d_1^2}}{g_2 \frac{L}{d_2^2}} \text{ and then,}$$

$$d_1 = \frac{d_0}{\left(\sqrt{\frac{E_1 g_1}{E_2 g_1}} - 1\right)} \quad \text{(Eq. 4)}$$

Eq. 4 shows that the distance $d_1$ to the floor surface 10 can be estimated from the measurements at the receivers 524a, 524b given a known baseline distance $d_0$ (FIG. 8A) between the receivers 524a, 524b. The parameters $g_1$ and $g_2$ are either known or the ratio $G_1/g_2$ can be estimated by calibration during manufacturing.

Figure 8B:
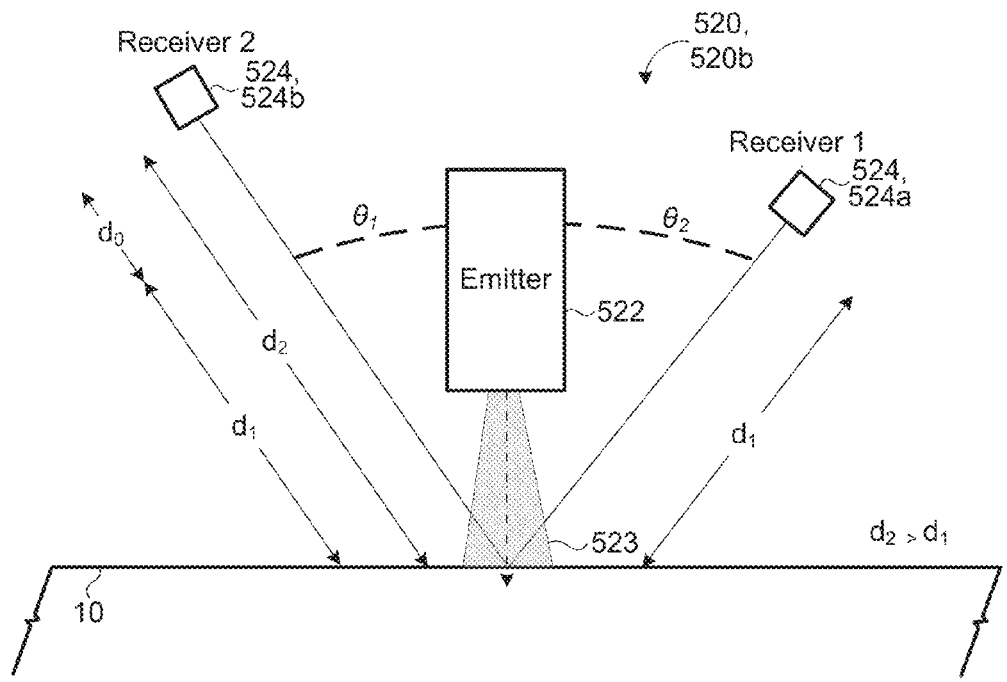
Figure 8C:
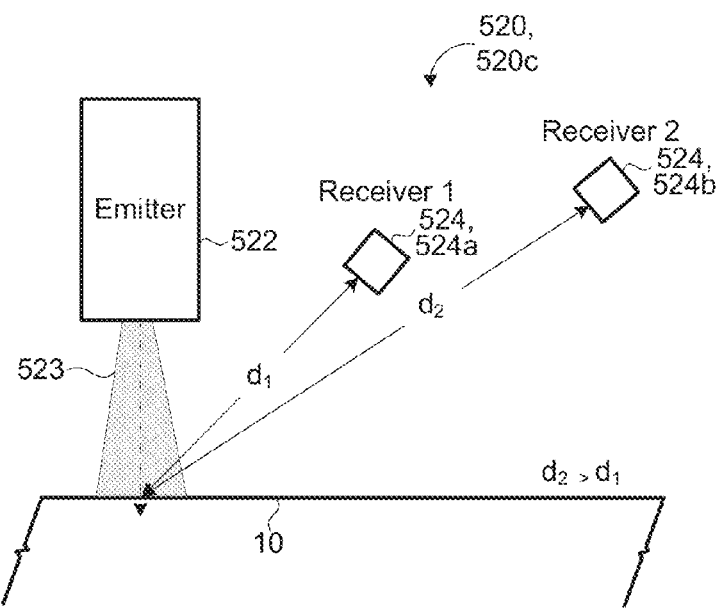

Referring to FIGS. 8B and 8C, in some implementations, a relative angle $\theta_i$ of the receivers 524a, 524b with respect to the emitter 522 is kept the same to make the proximity sensor 520b more robust on floor surfaces 10 with strong specular reflections (i.e. $\theta_1 = \theta_2$). Another example is shown in FIG. 8C. The proximity sensor 520c may be used to detect the presence of an obstacle, such as a floor surface 10 or a cliff 12, depending on the orientation of the sensor 520b, 520c with respect to the obstacle (i.e., if the sensor 520b, 520c is facing downwards, then the sensor 520b, 520c may detect the distance d to the floor surface 10; and if the sensor 520b, 520c is at an angle with respect to the robot body 110, then the sensor 520b, 520c may detect obstacles as the robot 100 is moving across a floor surface 10. For example, as FIG. 8E depicts, the differential distance measuring class type of sensor 520 of FIGS. 8A-8D may be used to range a distance d to an obstacle 9, such as a wall or a piece of furniture. This is useful for a number of reasons not limited to slowing the robot 100 at a certain distance d as it approaches the object to prevent an abrupt collision.)

Figure 8D:
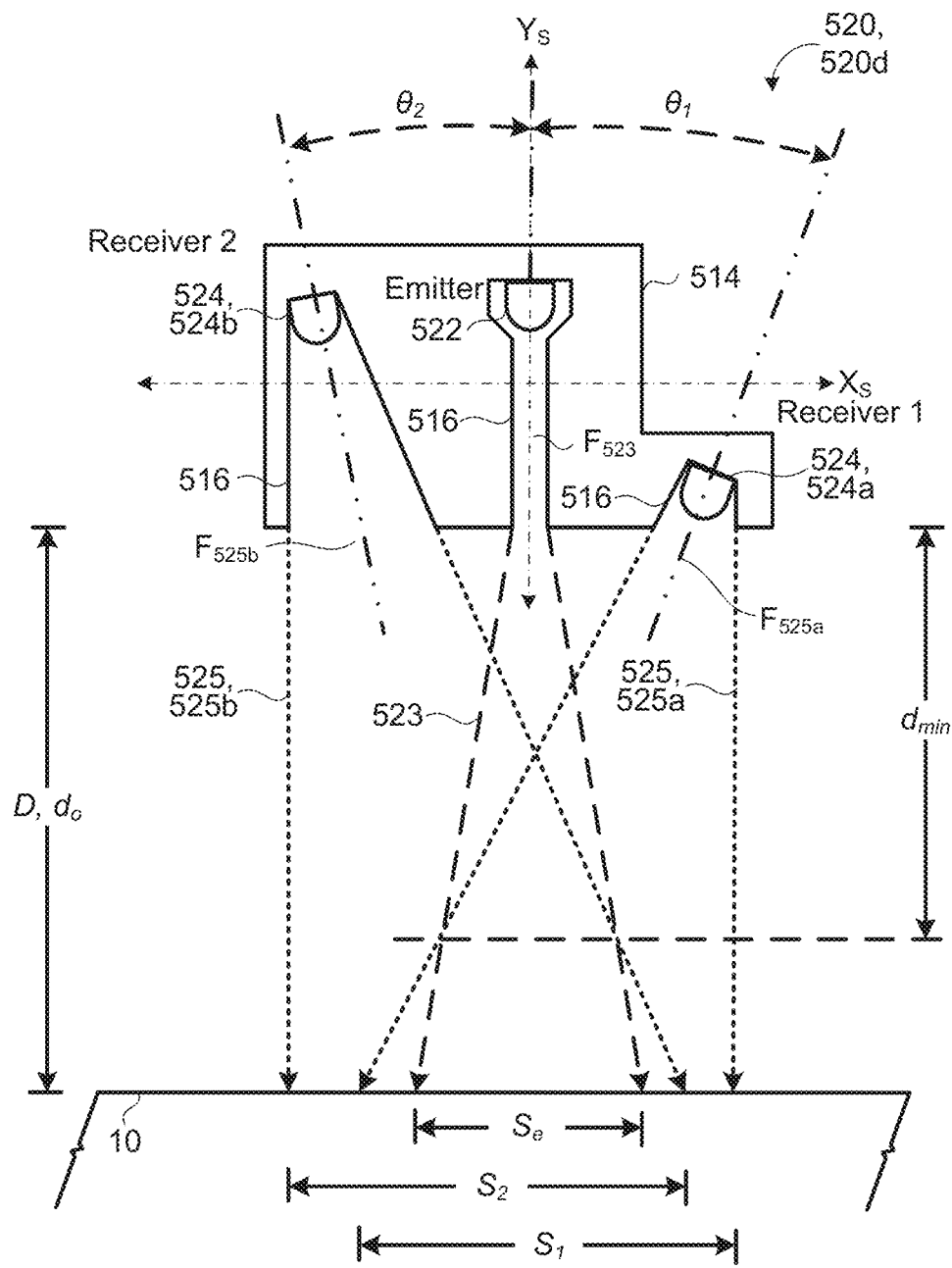
FIG. 8D is a section view of an exemplary proximity sensor.
Figure 8E:
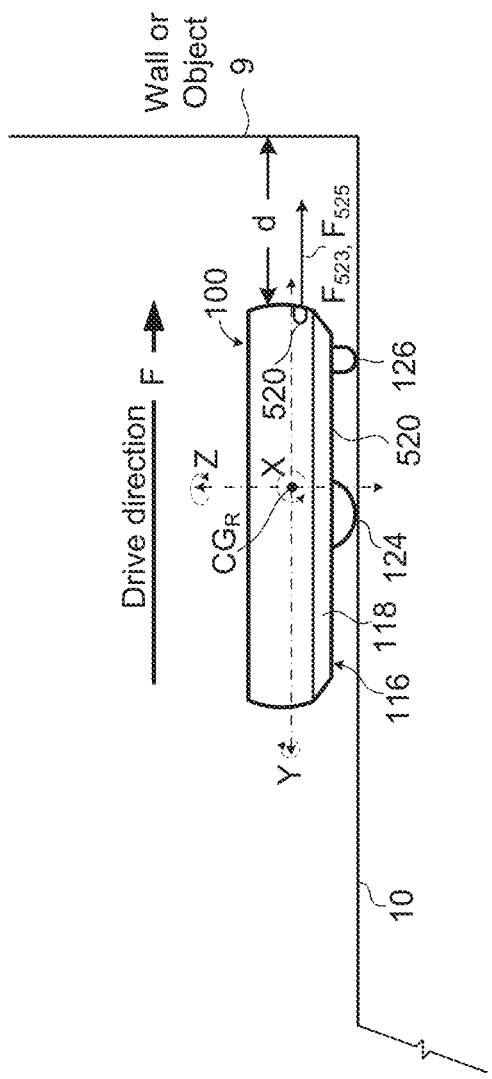
FIG. 8E is a side view of an exemplary autonomous robot as it traverses a floor surface and encounters an obstacle.

FIGS. 6, 7A, 7B, and 8D, show the proximity sensor 520 used on a mobile robot 100 to detect cliffs 12. Referring to FIG. 8D, in some examples, the proximity sensor 520d includes an emitter 522 and two receivers 524a, 524b. The emitter 522 is disposed between the first receiver 524a and the second receiver 524b. At distances $d_{min}$ or greater, the field of view 525a, 525b of either receivers 524a, 524b ($S_1$ and $S_2$) contain the complete field of emission 523 ($S_e$) of the emitter 522: $S_1 > S_e$ and $S_2 > S_e$.

The proximity sensor 520d is placed on the mobile robot 100 such that the floor surface 10 is at least a distance D from the proximity sensor 520d such that:

$$d_{min} \leq D \qquad \text{(Eq. 5)}$$

Eq. 4 may be used to estimate the distance d to the floor surface 10 at any time the robot 100 is moving about the floor surface 10. $d_0$ is the initial distance to the floor surface 10, which is D as shown in FIG. 8D. $E_1$ and $E_2$ are the intensities at the receivers 524a, 524b, which can be measured using an analog-to-digital converter. $g_1/g_2$ is the ratio of the receiver gains, which is assumed to be known or estimated during a calibration process discussed below. Therefore, a robot 100 may have a threshold drop distance $D_s$ that it can navigate over. In some implementations, the emitter 522 is modulated to 1 kHz so that it rejects ambient light and other stray light sources other than the emitter 522.

A cliff 12 may have a distance $D_C$ from the floor surface 10. The robot 100 can navigate over the cliff 12 when the estimated distance $d_1$ is less than a threshold drop distance $D_s$. If $d_1 > D_s$, then the robot 100 detects an actual cliff 12b, and the processor 202 may execute a behavior 300 to prevent the robot 100 from falling over the cliff 12.

In some examples, the parameters of the sensor 520 are unknown, as calibration at the time of manufacturing was not possible. The uncalibrated sensors 520 may be calibrated at run-time. In some examples, when the proximity sensors 520 are placed facing the floor surface 10 at a nominal distance $d_{1_n}$, refer the ratio measurement of Eqs. 1 and 2 to the ratio at the nominal surface. For the nominal distance $d_{1_n}$:

$$R_n = \frac{g_1}{g_2}\left(1 + \frac{d_0}{d_{1_n}}\right)^2 \qquad \text{(Eq. 6)}$$

Then for another distance:

$$\frac{1}{d_1} = \sqrt{\frac{R_n}{R}\left(\frac{1}{d_0} + \frac{1}{d_{1_n}}\right)} - \frac{1}{d_0} \qquad \text{(Eq. 7)}$$

where the distance $d_1$ can be estimated if the baseline offset of the two receivers $d_0$ and the nominal distance $d_{1_n}$ are known.

The sensor 520 can be used as a digital indicator of closeness to a surface by defining $d_{1_{th}} = kd_0$. Then the threshold for $R_{th}$ would be:

$$R_{th} = R_n \frac{\left(1 + \frac{1}{k}\right)^2}{\left(1 + \frac{d_0}{d_{1_n}}\right)^2} \qquad \text{(Eq. 8)}$$

and the sensor 520 would indicate that an obstacle is close when $R \geq R_{th}$ and that the floor surface 10 is far otherwise.

Assuming that $d_0 \cong d_{1_n}$ then $R_{th}$ would be, $$R_{th} \cong R_n \frac{\left(1 + \frac{1}{k}\right)^2}{\left(1 + \frac{d_0}{d_{1_n}}\right)^2} \qquad \text{(Eq. 9)}$$

Note that for $k >>> 1$ the threshold simplifies to $$R_{th} \cong \frac{R_n}{4}.$$

The threshold value is dependent on a good estimation of the nominal ratio measurement, so reliable estimation techniques may be used to find the value of $R_n$ and to constantly update it as the sensor 520 is exposed to different surfaces 10 (i.e., different floor levels).

Figure 9A:
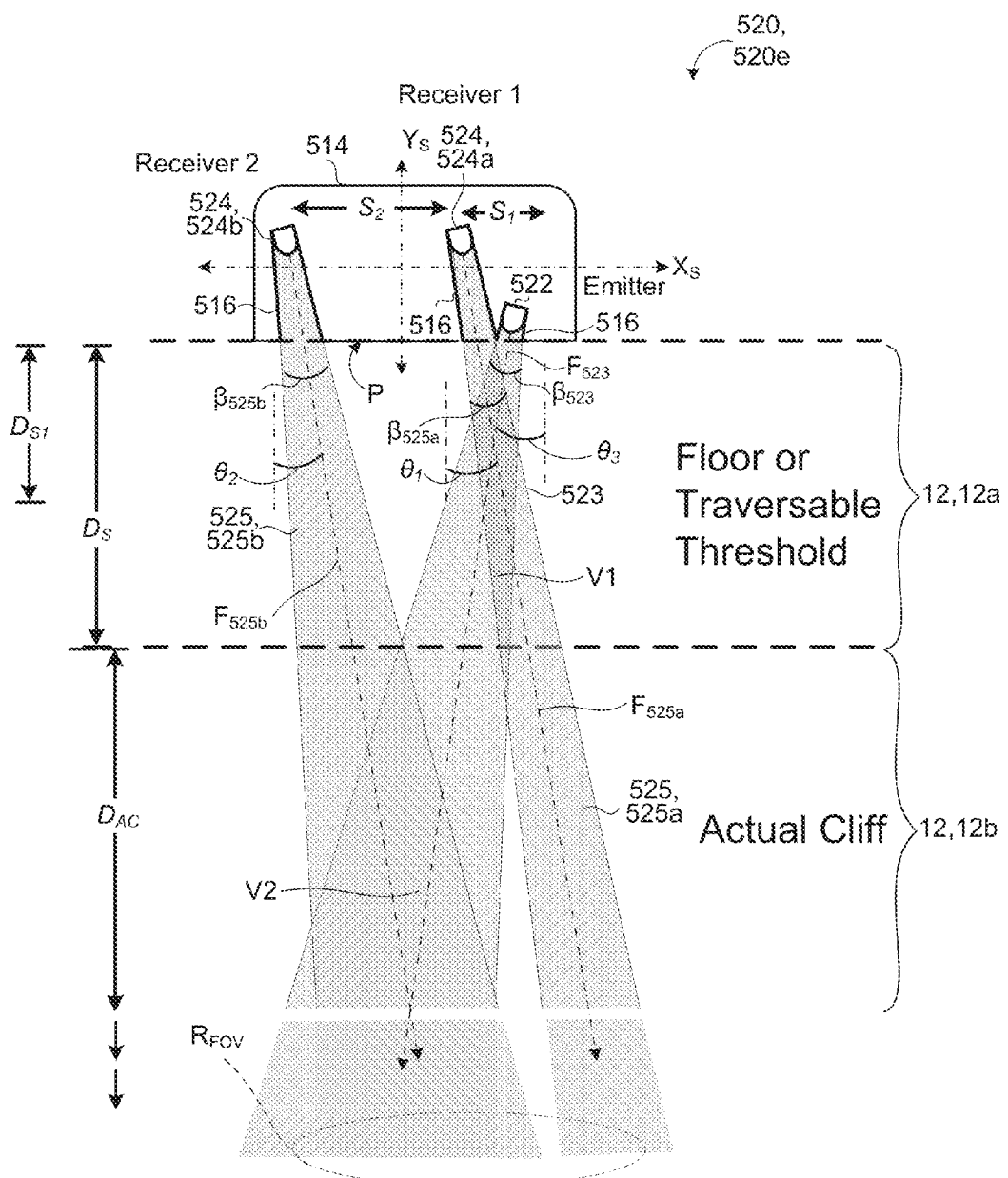
FIG. 9A is a side schematic view of an exemplary proximity sensor having one emitter and two receivers.
Figure 9B:
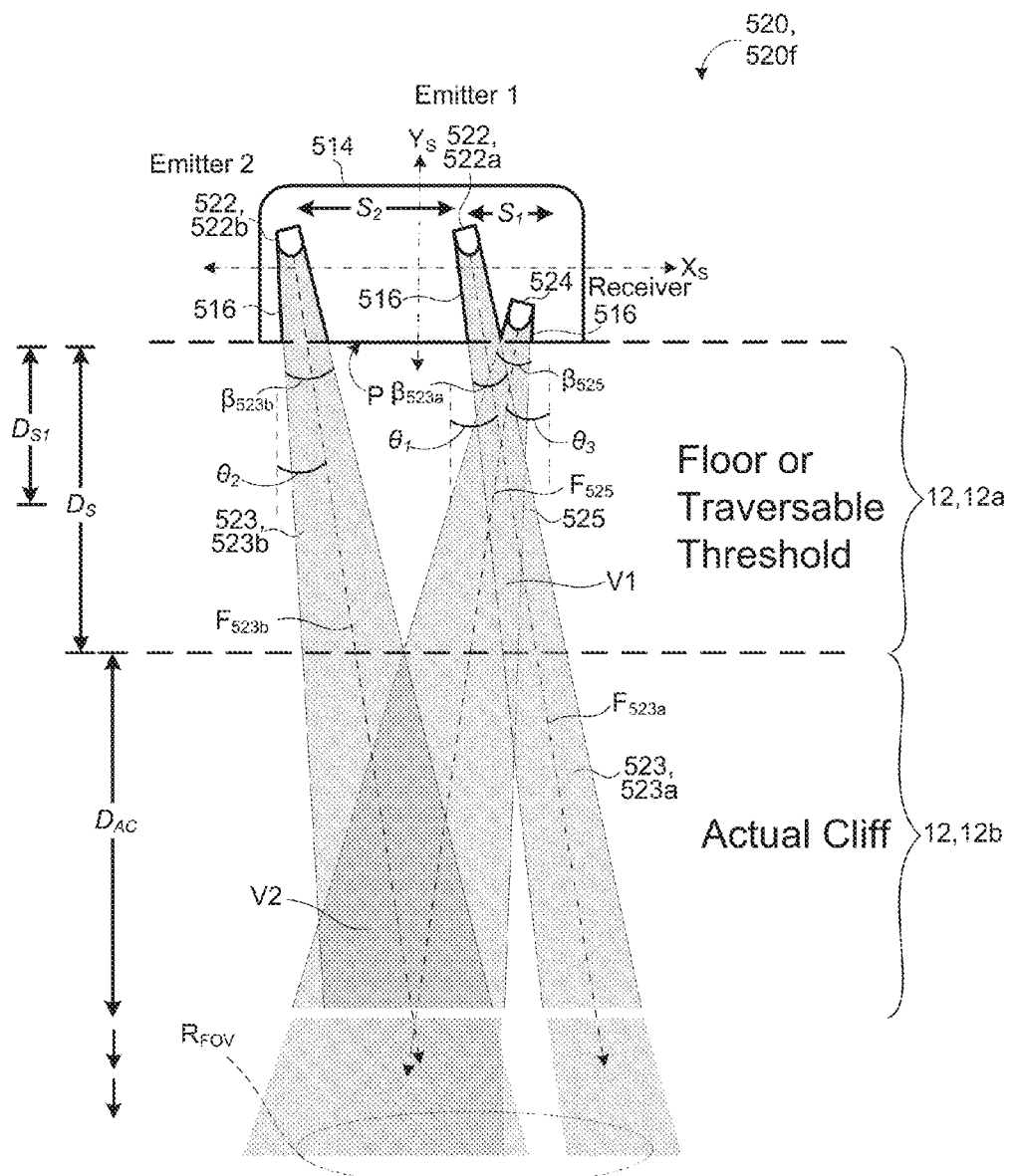
FIG. 9B is a side schematic view of exemplary proximity sensors having two emitters and one receiver.
Figure 11A:
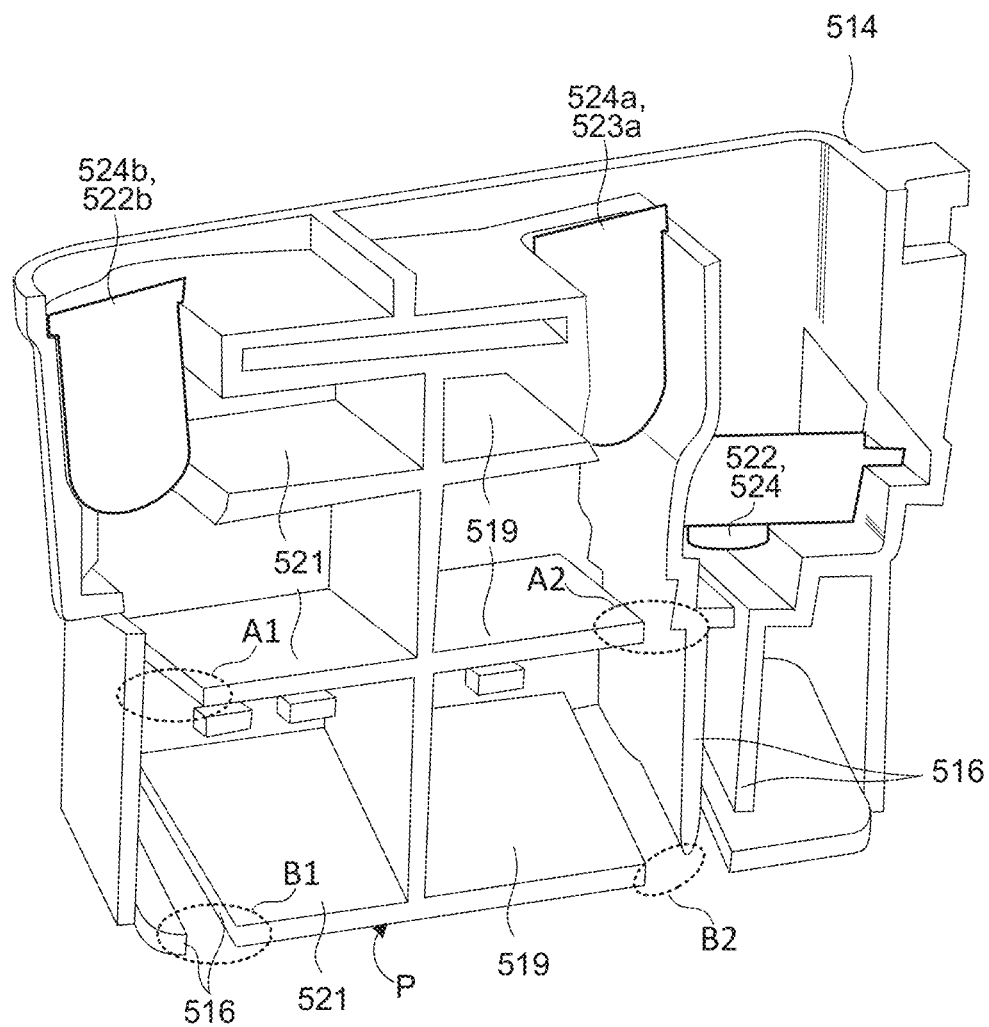
FIG. 11A is a section perspective view of an exemplary housing for the proximity sensors.

FIGS. 9A, 9B and 11A describe a two-volume "truth table" class of a three element proximity sensor (hereinafter "truth table class"), where two distinct volumes are used to classify variable drop distance, multipath, pitch angle, and albedo situations into an efficient decision matrix. Within this class, two elements of one kind and one of the remaining kind are used for different implementations (two emitters with one receiver; or two receivers with one emitter).

Referring to FIGS. 9A, 11A and 13A-H, in some examples, the proximity sensor 520e includes a sensor body 514 housing an emitter 522 and first and second receivers 524a, 524b. The receivers 524a, 524b are adjacent to one another. The emitter 522 is disposed adjacent the first receiver 524a on an opposite side of the second receiver 524b. The distance $S_1$ separating the emitter 522 and the first receiver 524a may be less than the distance $S_2$ between the first receiver 524a and the second receiver 524b. The emitter 522 has an emitter field of view 523, and each of the first and second receivers 524a, 524b has a respective first and second field of view 525a, 525b. The emitter field of view 523 intersects the first receiver field of view 525a and defines a first volume V1. In addition, the emitter field of view 523 intersects the second field of view 525b defining a second volume V2. The first volume V1 defines a zone having a threshold drop distance $D_s$ (as previously noted, $D_s$ is the maximum distance at which the robot 100 can go from a first surface 10a to a second surface 10b) and the second volume V2 being at a distance $D_{AC}$ greater than the threshold drop distance $D_s$. The first volume V1 and the second volume V2 therefore define two layers that overlap at different distances (within and up to a distance of $D_s$ and beyond distance $D_s$) detected by two different receivers 524a, 524b. As summarized below in binary truth table 1, the "1" or "0" indicates a received emission from a surface at either, both or neither volume V1, V2 and the binary nature of detection at those volumes, in combination, determines how the robot show act. If the sensor 520 receives a response in the first volume V1, but not in the second volume V2, the robot 100 detects the only flooring condition for continuing to travel in the current direction of travel. If the sensor 520 detects flooring in the first volume V1 and in the second volume V2, an actual cliff 12b is signaled to the robot 100 and the robot 100 stops moving. If the sensor 520 detects flooring in the second volume V2 only and not in the first volume V1, the robot 100 is signaled to stop because no floor is detected within threshold drop distance $D_s$. If the sensor 520 neither detects flooring in the first volume V1 nor the second volume V2, the robot 100 stops because the floor surface 10 is either too far away for either receiver 524a, 524b to receive an emission, the floor is too dark (and absorptive) for an emission 523 to reach either receiver, or the sensor 520 has stopped working.

TABLE 1

| Condition | No Cliff | Detectable stair drop = Cliff (close to robot or a cliff far from the robot on a really diffusely reflective surface - e.g. 8 inch drop w/ white surface that reflects both emissions) | Detectable Stair Drop = Cliff (far from robot) | Floor is far away, and/or floor is dark, and/or sensor stopped working |
|---|---|---|---|---|
| V1 | 1 | 1 | 0 | 0 |
| V2 | 0 | 1 | 1 | 0 |
| Action | Drive | Stop, reverse and/or turn away | Stop, reverse and/or turn away | Stop, reverse and/or turn away |

In other words, if the robot 100 detects a surface 10 having a distance d from the robot 100 less than threshold drop distance $D_S$, then the robot 100 determines that it may continue moving over the surface 10. If the distance d is less than a return threshold distance $D_{S1}$, then the robot 100 can freely move between the two surfaces 10a, 10b. If the robot 100 determines that the distance d is greater than the threshold drop distance $D_S$, then the robot 100 determines that it should not continue in its path because an actual cliff 12b, is present. Using two receivers ensures a valid, true positive sensor reading of flooring present within the threshold drop distance $D_S$ from the bottom surface of the cliff sensor 520, the first receiver field of view 525a intersects the emission 523.

Referring to FIGS. 9B and 11A-C, and 13A-H, in some examples, the proximity sensor 520f includes a sensor body 514 housing a receiver 524 and first and second emitters 522a, 522b instead of the one emitter 522 and the two receivers 524a, 524b as previously described. The emitters 522a, 522b are adjacent to one another. The receiver 524 is disposed adjacent the first emitter 522a on an opposite side of the second emitter 522b. The distance $S_1$ between the receiver 524 and the first emitter 522a may be less than the distance between the first emitter 522a and the second emitter 522b $S_2$. The receiver 524 has a receiver field of view 525, and each of the first and second emitters 522a, 522b has a respective first and second field of view 523a, 523b. The receiver field of view 525 intersects the first emitter 522a field of view 523a and defines a first volume V1. In addition, the receiver field of view 525 intersects the second emitter field of view 523b defining a second volume V2. The first volume V1 and the second volume V2 therefore define two layers of overlap at different distances (within and up to a threshold drop distance of $D_S$ and beyond threshold drop distance Ds) having illumination from two different sources. In some implementations, the sources (i.e. emitters 522a, 522b) can have the same illumination and the robot 100 modulates emissions in the time domain, alternately turning one on, one off to distinguish the two emissions. In examples having multiple sensors modulated in the time domain, the sensors 520 will fire in a round robin sequence, blinking such that the robot 100 processor will process at (or faster than) 1 ms per sensor and respond in time to a cliff condition while traveling (e.g., redirect the robot 100 from a sensed actual cliff 12b before an unrecoverable event occurs). In another implementation, the two emitters 522a, 522b are modulated differently in the frequency domain. In some implementations, employing a FFT technique results in a response within 1 or 2 periods of modulation frequency. In some implementations, the emitters 522a, 522b are modulated in the optical frequency domain and use two different colors of emission for reliable separate detection of the two sources, and the receiver 524 distinguishes the two different wavelengths.

FIGS. 13A-13H depict state diagrams showing the various conditions of sensing surfaces within the first and second volumes V1, V2. As FIGS. 13A and 13B depict, in a situation where the robot 100 encounters a dark colored surface at a cliff 12 or a very high cliff, the first volume V1 is not sensed because the floor (or cliff bottom) is too dark to reflect any light. The second volume V2 is not sensed because the cliff bottom is too dark or too far. As FIGS. 13C and 13D depict, the robot 100 will stop moving if a traversable surface is not sensed within volume one V1 because the reflection is excluded by the baffles 519, 521 and angles of the housing 514 of the sensor 520 when the robot travels over a dark or light colored bottom of a cliff 12 that is perceived within the second volume V2. As FIGS. 13E and 13F depict, when the robot 100 is on a traversable surface 12a (i.e. not at an actual cliff 12b), the floor 10 will be perceptible within volume one V1, but no floor 10 is perceived within volume two V2 because the reflection is excluded by the baffles 519, 521 of the housing 514 and the angle $\theta_2$ of the second emitters 522b (or second receiver 524b) and the angle $\theta_3$ one receiver 524 (or one emitter 522). In FIGS. 13G and 13H, when the robot 100 will stop moving because it is at an actual cliff 12b having a light colored cliff bottom and vertical riser 13. Here, a multipath reflection 523m will indicate a surface within volume one V1, but a cliff bottom floor surface 10 is also perceived within volume two V2 because the baffles 519, 521 of the housing 514 and the angle $\theta_2$ of second emitter 522b (or second receiver 524b) and the angle $\theta_3$ of the one receiver 524 (or one emitter 522) enable seeing a cliff bottom surface 10 or a reflection/multipath from a very light surface.

In the implementation depicted in FIGS. 9A-9B, the first, or near, volume V1 is confined, using lensing of the LED, baffling, and/or other optical confinement, collimation, or field restriction, to extend between the body of the robot and the end of the region of interest for the near volume V1. The region of interest for the near volume V1 includes the ride height of the robot for both carpets and hard floors (i.e., short, medium, and high pile carpet fiber distal ends will be within this region, as will hard floor surfaces). Accordingly, the near volume V1 extends (in a robot of about 20-40 cm width and wheel diameter of about 3-8 cm) from the robot or sensor bottom at 0 cm to approximately 3 to 5 cm from the robot or sensor bottom. The volume V1 may be configured to begin slightly spaced from the robot or sensor bottom, e.g., at 0 to 2 cm rather than 0 cm.

The received signal strength within the near or far volumes may be stronger if the reflection comes from the top of the region than at the bottom of the region. In each of FIGS. 9A-9B, a region $R_{FOV}$ is shown in which the field of view of the receivers continues, but only stronger reflections will be detected. The near and far volumes may be bounded mostly by the overlap of the emitter and receiver fields of view (e.g., near volume V1 in FIGS. 9A and 9B), or additionally by a threshold signal strength (e.g., the bottom of the far volume V2).

In order to create a sharper boundary for signal detection between the first volume V1 and/or second volume V2, either or both of the fields of view may be bounded by a plurality (i.e., more than one) baffles in series. In FIG. 11A, two sequential baffles 519 create a sharper edge of the volume at the transition from the near volume to the far volume V2. Additionally, two sequential baffles 521 create a sharper edge of the volume V2 at the transition from the near volume V1 to the far volume V2 (i.e., where threshold distance DS stops and actual cliff distance DAC begins in FIGS. 9A and 9B).

As shown in FIGS. 9A and 9B, the first or near volume V1 has a topmost limit of approximately 0-2 cm from the bottom of the robot 100 (or sensor 520 exit, e.g., near B1-B2 in FIG. 11A), and a lowermost limit of about 3-5 cm from the bottom of the robot 100 (or sensor 520 exit). Optionally, the approximate middle portion of this volume V1 may be at the expected floor distance (including carpet or hard floor).

As shown in FIGS. 9A and 9B, the second or far volume V2 has a topmost limit of approximately 4-6 cm from the bottom of the robot 100 (or sensor 520 exit, e.g., near B1-B2 in FIG. 11A), and a lowermost limit of about 6-10 cm from the bottom of the robot (or sensor exit) for darker surfaces, and a lowermost limit of about 6-25 cm from the bottom of the robot 100 for lighter surfaces. The lowermost limit of the second or far volume V2 would include many dark or light stair runs, e.g., because standard stair risers 13 are 6-8 inches worldwide. The lowermost limit of volume V2 may be bounded by the expected signal strength of signal return from darker surfaces or distant light colored surfaces.

Similar to the previous example having one emitter 522 and two receivers 524, the first volume V1 defines a zone within first threshold drop distance $D_S$ and the second volume V2 being at a cliff condition (actual cliff 12b), i.e. a threshold distance $D_{AC}$ greater than threshold drop distance $D_S$. As summarized above in Table 1, if the sensor 520 receives a response indicating flooring in the first volume V (i.e. the receiver 524 detects an emission 523a in the first volume V1), but not in the second volume V2, the robot 100 has detected the only flooring condition for continuing to travel in the current direction of travel. If the sensor 520 detects flooring in the first volume V1 and in the second volume V2, a cliff condition (actual cliff 12b) is signaled to the robot 100 and the robot 100 stops moving. If the sensor 520 detects flooring in the second volume V2 only and not in the first volume V1, then the robot 100 is signaled to stop because no floor 10 is detected within threshold drop distance $D_S$. If the sensor 520 neither detects a floor surface 10 in the first volume V1 nor the second volume V2, the robot 100 stops because the floor surface 10 is either too far away for either the field of emission 523a, 523b (also referred to as the field of view) to reach the receiver 524, the floor is too dark (and absorptive) for an emission 523a, 524a to reach the receiver 524, or the sensor 520 has stopped working. In other words, if the robot 100 detects a cliff 12 having a distance d from the robot 100 less than threshold drop distance $D_S$, then the robot 100 determines that the cliff 12 is a traversable threshold 12a and it may continue moving over the traversable threshold 12a. If the distance d is less than a return threshold drop distance $D_{S1}$, then the robot 100 can freely move between the two surfaces 10a, 10b that are separated by the traversable threshold 12a. If the robot 100 determines that the distance d is greater than the threshold drop distance $D_S$ (i.e., the traversable threshold 12a) then the robot 100 stops because an actual cliff 12b is present. Using two emitters 522a, 522b having respective emissions 523a, 523b that intersect the receiver field of view at different distances, ensures a valid, true positive sensor reading of a flooring surface 10 present within the threshold drop distance Ds.

Referring back to FIGS. 8A-8D, 9A, and 9B, the emitter 522 or emitters 522a, 522b of each proximity sensor 520 may emit infrared light. Each receiver 524 or receivers 524a, 524b receive reflections of the emitted infrared light. In some examples, each sensor component 522, 524 (i.e., emitters and receivers) defines a field of view axis F, and the sensor body 514 defines a transverse axis $X_S$ and a longitudinal axis $Y_S$. The sensor components 522, 524 may be disposed along the transverse axis $X_S$ with their field of view axes F arranged at an angle $\theta_1$, $\theta_2$, $\theta_3$ with respect to the longitudinal axis Ys. In some examples, at least one emitter 522 forms an acute angle with a receiver 524 for the receiver 524 to receive the reflected light. The sensor transverse axis Xs may be at an angle or parallel to the robot traverse axis X. Additionally or alternatively, the sensor longitudinal axis $Y_S$ may be at an angle or parallel to the robot central vertical axis Z.

Referring to FIG. 8D, the field of view 523 of the emitter 522 may be along the longitudinal axis $Y_S$ and may form an angle $\theta_3$ with respect to the longitudinal axis $Y_S$ equals to zero. Other arrangements are possible as well.

As shown in FIG. 9A the field of view axes $F_{525a}$ and $F_{525b}$ of the receivers 524a, 524b may be parallel or arranged at an angle $\theta_1$, $\theta_2$ of between 0 and about 45 degrees with respect to the longitudinal axis $Y_S$ of the proximity sensor body 514, and in some examples having a narrow housing body 514, $\theta_1$, $\theta_2$ may fall between about 5 and 25 degrees to achieve a specified maximum threshold drop distance $D_S$. In some implementations, angles $\theta_1$, $\theta_2$ need not be equal. In some implementations, the field of view angle $\beta_{523b}$ of the far volume emitter field of view 523b may be approximately 5-15 degrees, preferably approximately 10 degrees, while the field of view $\beta_{523a}$ of the near volume emitter field of view 523a may be approximately the same as this. In this case, the field of view angle $\beta_{525}$ of the receiver field of view 525 is 1-3 times the width of the field of view of the emitters, e.g., 5-30 degrees. In some examples, the field of view axis $F_{523}$ of the emitter 523 is arranged at an angle $\theta_3$ between about 5 degrees and about 45 degrees with respect to the longitudinal axis $Y_S$. The field of view axis $F_{523}$ of the emission 523 may be arranged to intersect the field of view $F_{525a}$, $F_{525b}$ of both the receivers 524a, 524b. A spread angle $\beta_{523}$ of the field of view axis $F_{523}$ of the emitter 522 may be greater than the spread angles $\beta_{525a}$, $\beta_{525b}$ of the field of view axes $F_{525a}$, $F_{525b}$ of the receivers 524a, 524b. The spread angles may be centered on their corresponding field of view axes. Similarly, in FIG. 8F, the field of view axes $F_{523a}$ and $F_{523b}$ of the emissions 523a, 523b may be parallel or arranged at an angle $\theta_1$, $\theta_2$ of between 0 and about 45 degrees with respect to the longitudinal axis $Y_S$ of the proximity sensor body 514, and in some examples having a narrow housing body 514, $\theta_1$, $\theta_2$ may fall between about 5 and 25 degrees to achieve a specified threshold drop distance $D_S$. In some examples, the field of view axis $F_{525}$ of the receiver 525 is arranged at an angle $\theta_3$ between about 5 degrees and about 45 degrees with respect to the longitudinal axis $Y_S$, and may be arranged to intersect the field of view axes $F_{523a}$, $F_{523b}$ of the emitters 522a, 522b. A spread angle $\beta_{525}$ of the field of view axis $F_{525}$ of the receiver 524 may be greater than spread angles $\beta_{523a}$, $\beta_{523b}$ of the field of view axes $F_{523a}$, $F_{523b}$ of the emitters 522a, 522b. Again, the spread angles may be centered on their corresponding field of view axes. In some examples, $D_S$ is between about 1 inches and about 3 inches, and a cliff 12 is detected when d is greater than $D_S$ (e.g., greater than about 2 inch).

In some implementations, as indicated in FIGS. 9A and 9B, an emitter 522, 522a and a receiver 524, 524a are aimed to look at a first area of interest (e.g., a first floor surface 10). The second emitter 522b or second receiver 524b is added to control for false detections of multipath reflections of emitted light from the emitter 522 or stray photons of light, which is caused by the high gain and sensitivity of the sensor 520. In some implementations, the sensor 520 uses coded modulation (data over 38 kHz) to distinguish between the first emitter 522a and second emitter 522b and the sensor is therefore a hybrid of time- and frequency-coding, wherein the frequency coding excludes external sources and the time-coding distinguishes between which emitter is firing. In some implementations, a 38 kHz receiver 524 is used with approximately 90 dB of amplification, using 8 bits of simultaneously coded data. Six bits are used to identify the transmission source as a cliff sensor 520, and two are to identify transmission source as belonging to either the first or second emitter 522a, 522b. In some implementations, the receiver is a photodiode with approximately 80 dB of gain modulated at 1 kHz, with using two bits of coded data to identify transmission source as belonging to either the first or second emitter.

Cliff sensors 520 with only one emitter and one receiver have difficulty sensing certain floor surfaces 10. Specifically surfaces 10 that are very optically absorbent in the near IR range (i.e. black carpet) can cause a sensor to trigger at the wrong distance d. Because the receiver 524 of the cliff sensor 520 has a high gain to account for black carpet, it can see a small amount of light reflecting from dark surfaces, but it also can see light reflecting from surfaces beyond threshold drop distance $D_S$. The second emitter 522b or second receiver 524b is aimed at this second area of interest (e.g., a potential second floor surface 10b) beyond the threshold drop distance $D_S$ to verify the presence of (or lack of) a cliff 12. For example, in the example of FIG. 8F, the second emitter 522b is arranged such that the receiver 524 can only see the emission beam 523b on distance surfaces 10 beyond the threshold drop distance $D_S$ that indicates a cliff 12 and causes the robot 100 to stop moving. With this specifically arranged second emitter 522b, the sensor 520 can positively determine a flooring surface 10 positioned within the threshold drop distance $D_S$ when the first emitter 522a indicates the presence of a floor surface 10 in the first volume V1 and the second emitter 522b does not indicate a cliff 12 because the intersection of the receiver field of view 525 and the second emission 523b is preempted by the presence of a near flooring surface 10 over which the robot 100 may travel uninterrupted. In other words, the cliff sensor 520 signals the robot 100 to keep moving because no cliff 12 is present as determined by the sensing of a flooring surface 10 positioned at a height d within the threshold drop distance $D_S$, and as determined by the lack of sensing a flooring surface 10 beyond the threshold drop distance $D_S$. The floor surface 10 prevents the formation of second volume V2 all together. Without the formation of the second volume V2, no flooring surface 10 exists to be sensed within that volume.

The emitters 522 and the receiver 524 may be activated incrementally or sequentially to prevent crosstalk, which occurs when one sensor component receives signals from two sensor components at the same time, thereby causing incorrect (e.g. false positive or false negative) detections of objects or cliffs 12. In other examples, as described above, the multiple cliff sensors may be activated sequentially to reject multipath readings. In still other examples using FFT, concurrent emissions have emitters of varying frequencies that prevent erroneous readings. In yet other examples, the emitters 522a, 522b are modulated in the optical frequency domain and use two different colors of emission for reliable separate detection of the two sources, and the receiver 524 distinguishes the two different wavelengths.

Figure 9C:
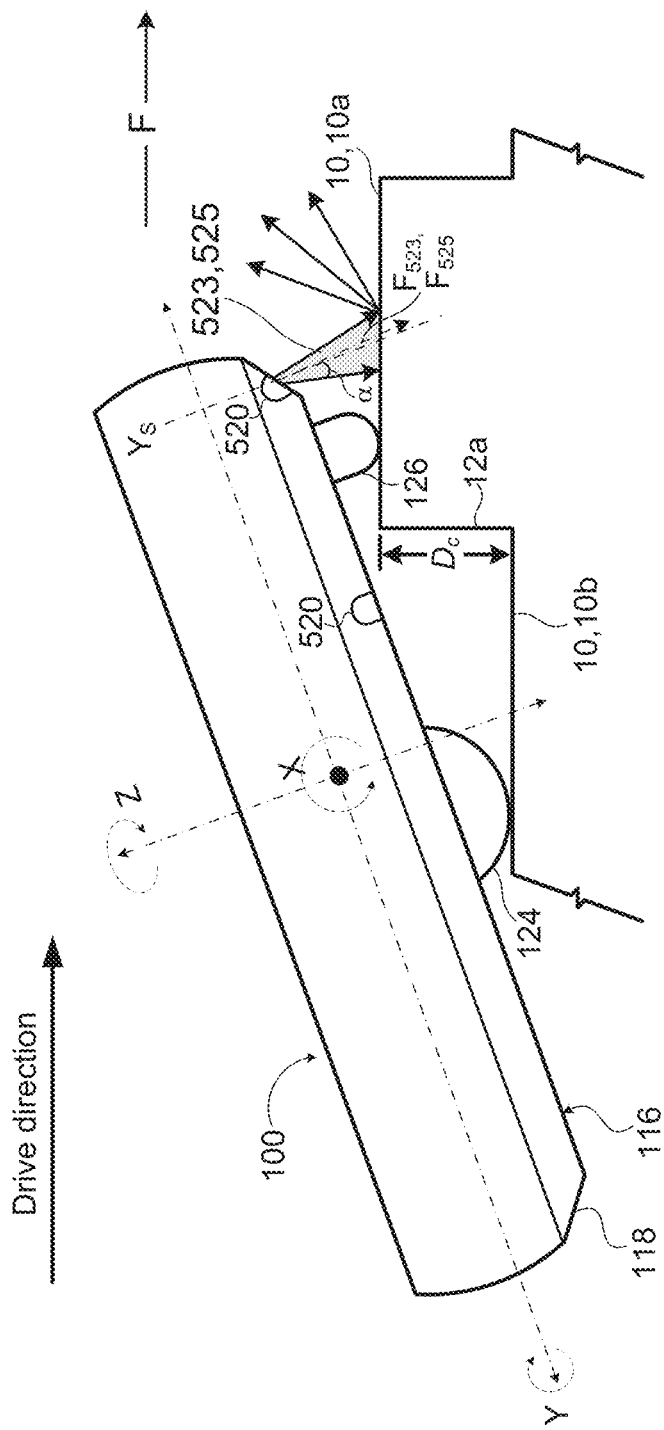
FIG. 9C is a schematic view of an exemplary proximity sensor showing the angle of the field of view of the proximity sensor.
Figure 10A:
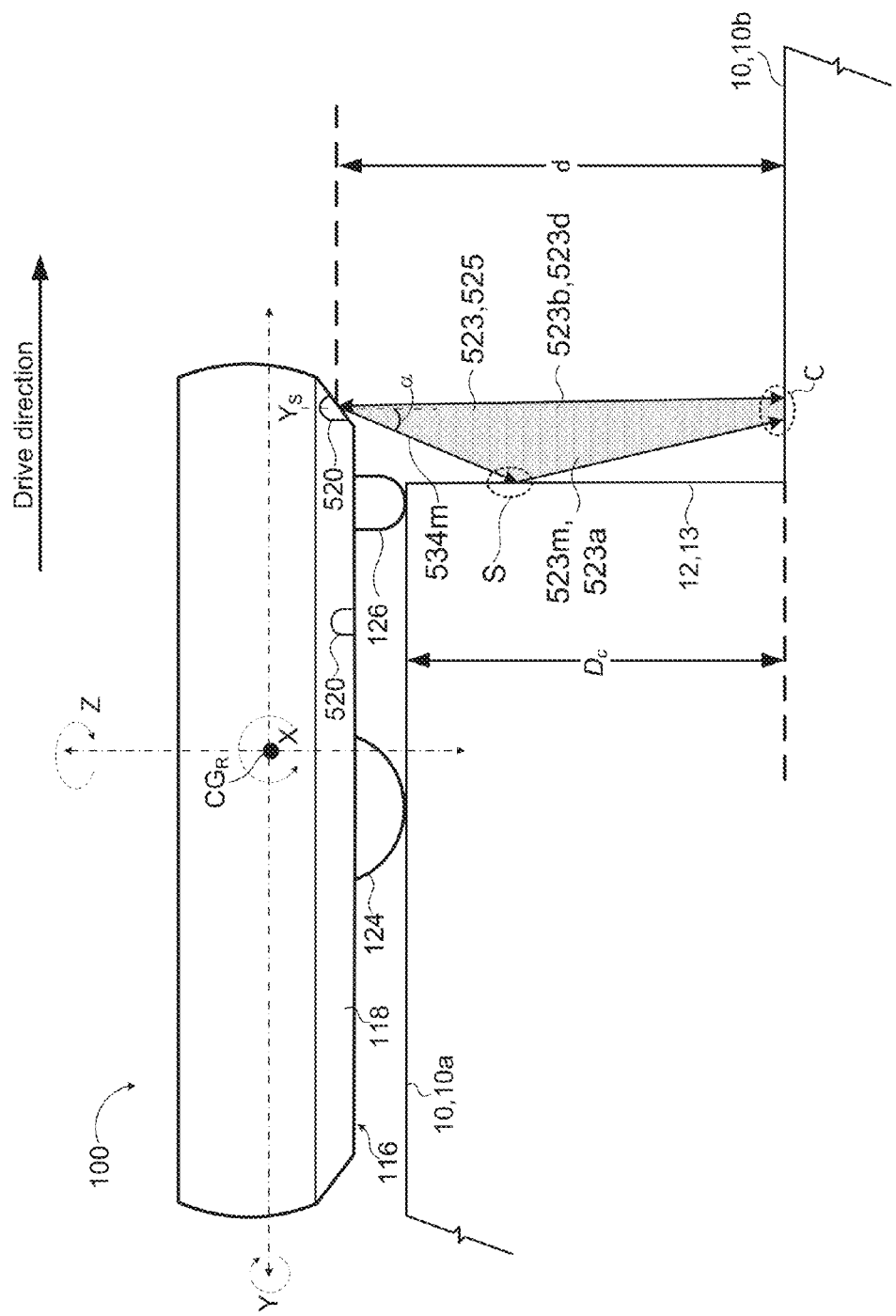
FIG. 10A is a schematic view of an exemplary proximity sensor encountering a cliff.
Figure 10B:
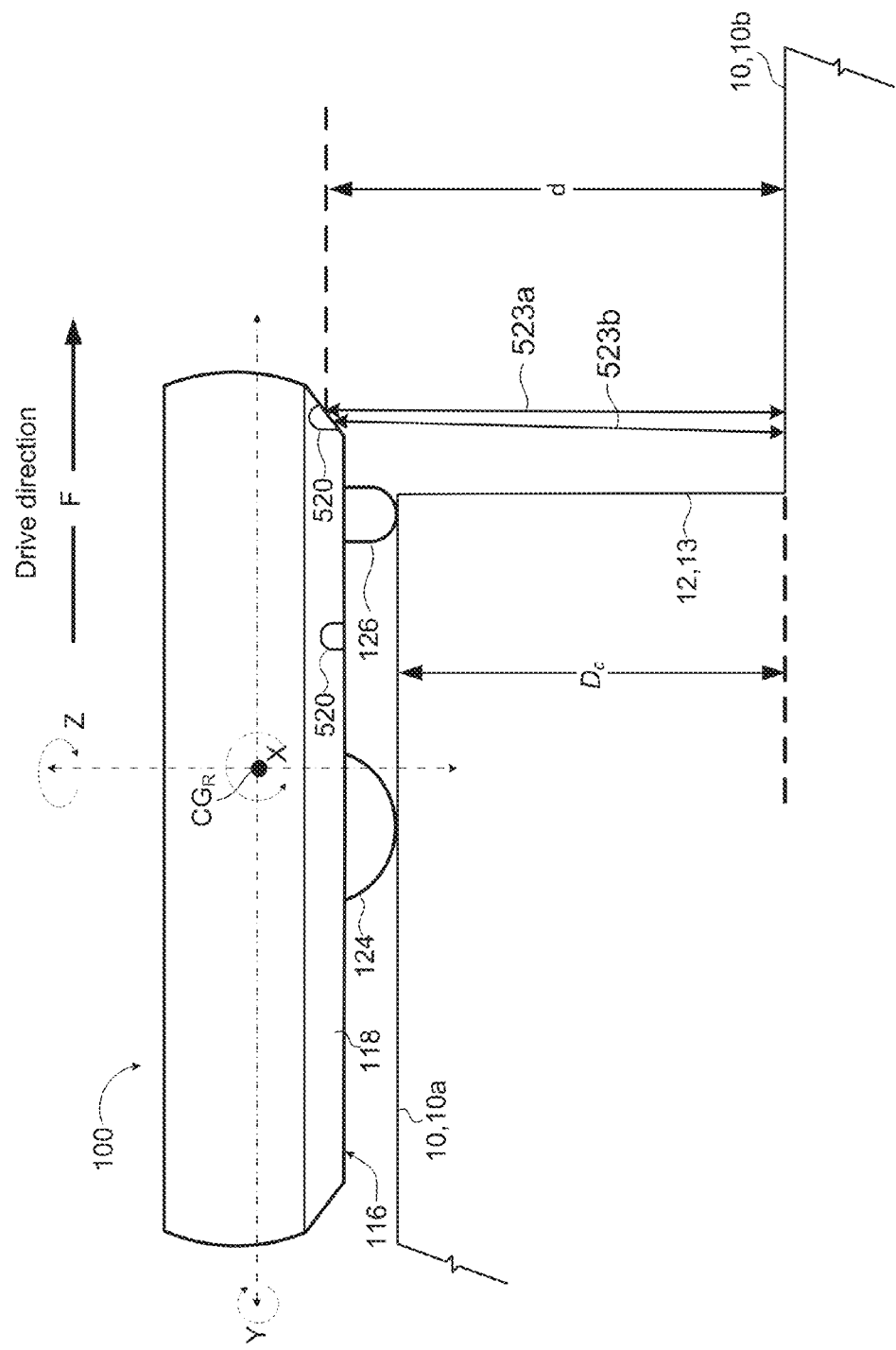
FIG. 10B is a schematic view of an exemplary proximity sensor encountering a cliff.

Turning to FIGS. 9C, 10A, and 10B, in some implementations, field of view 523, 525 of the cliff sensor 520 looks rearward (with respect to the primary direction of travel F) at a look back angle α. In some examples, α is less than 10 degrees (from the longitudinal axis Ys of the sensor). This angle α is determined to balance two opposing constraints: first, that the robot 100 can still sense the floor 10 while climbing an obstacle (for example the drop distance $D_C$ that separates a first floor surface 10a from a second floor surface 10b as depicted in FIG. 9G), and second, so that the robot 100 does not look so far back that it sees a stair riser 13 (or other vertical surface ahead of a drop as depicted in FIG. 10A) of an actual cliff 12b from which the robot 100 cannot descend. (In FIG. 10A, multipath emission 523m equates the emission 523a associated with the first emitter 522a and the first volume V1 and direct emission 523d equates to the emission 523b associated with the second emitter 522b and the second volume V2.) Because the sensor receiver 524 receives an emission 523d indicating a distance d beyond threshold drop distance $D_S$ in addition to receiving the multipath emission 534m bouncing off of the stair riser 13, the robot 100 is signaled to a cliff condition (i.e., an actual cliff 12b). In other words, as the robot 100 travels toward a cliff 12b having a distance d (from the sensor 520 to the second floor surface 10b) greater than $D_S$, any multipath emission 534m that bounces off of the stair riser 13 and returns to the receiver 524 of the cliff sensor 520 may not have a geometric chance of happening before the robot 100 navigates into an unrecoverable state (for example, with a wheel 124, 124a, 124b or caster 126 hanging off the drop), at which point the sensor receiver 524 receives an emission 523d indicating an actual cliff 12b. By adjusting the field of view look back angle α of the cliff sensor 520 to look rearward at less than 10 degrees, this minimizes the likelihood that the multipath emission 523m will bounce off of a vertical surface 13 and falsely indicate a distance d to the floor surface 10 within the threshold distance $D_S$, which happens at a look back angle α larger than 10 degrees. This prevents the caster 126 from rolling over the edge of a cliff (d>$D_S$) and causing the robot 100 to enter an unrecoverable state, such as falling or getting struck on the edge of a drop. As depicted in FIG. 9C, by having the field of view 523, 525 of the cliff sensor 520 look reward of the direction of travel F, the robot 100 can sense a traversable threshold 12a (i.e., a flooring condition within the threshold drop distance $D_S$) when the robot 100 is tilted to traverse a cliff 12a having a drop distance $D_C$ that separates the first floor surface 10a from the second floor surface 10b and a rise height and drop height (i.e., distance d from the sensor 520) at or within the threshold drop distance range $D_S$. FIG. 10B depicts a condition aligning with the sensor response in the second column of Table 1, in which response both emissions 523a, 523b are received by the receiver 524 after reflecting off of a surface 10 positioned beyond the threshold distance $D_S$. The surface here is too far away (d>>$D_S$) and the surface 10 is diffusely reflective, such as a white marble stair.

In any case, as described above with regard to Table 1, the robot 100 may respond to four sensor conditions, only one of which indicates a condition (d≤$D_S$) in which the robot 100 continues traveling without concern of an actual cliff 12b. The robot 100 may response to other sensor conditions as well.

Figure 11B:
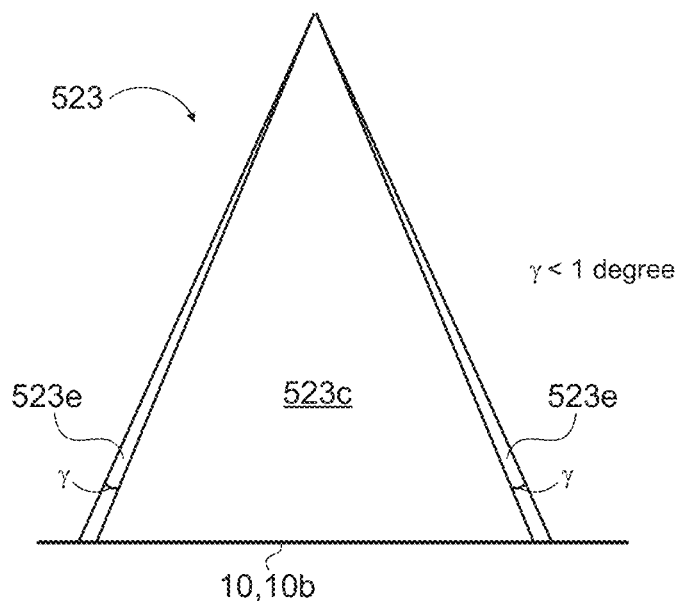
FIG. 11B is a section perspective view of a light beam projected from the exemplary housing of FIG. 11A striking a surface.
Figure 11C:
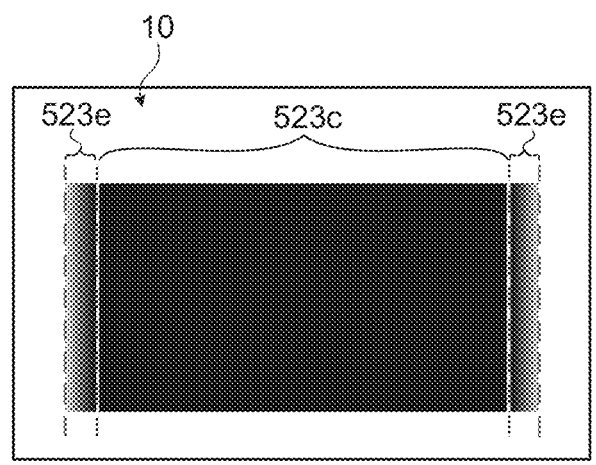
FIG. 11C is a top view of a light beam emitted from the exemplary housing of FIG. 11A projected a surface.

Referring to FIGS. 11A-11C, the sensor body 514 includes at least one wall 516, which defines the field of view 523, 525 of at least one of the sensor components 522, 524. The walls 516 prevent or reduce reflected light from the emitters or receivers from hitting or from being received by the object or cliff 12. The walls 516 direct the light with baffling pinch points A1, A2, B1, B2; therefore, the walls 516 define the field of view 523, 525 of the at least one of the sensor components 522, 524. The walls 516 may be designed to narrow or expand the field of view 523, 525 of the sensor components 522, 524. As depicted in the example of FIG. 11A, the sensor body 514 has a double baffle with 4 pinch points (2 upper pinch points A1, A2 and two lower pinch points B1, B2). The openings of the upper pinch points A1, A2 allow emissions 523 to fill the volume of the housing 514 and the lower pinch point openings B1, B2 create a crisp cut offs, (i.e. sharply emitted light boundaries). The emissions 523, are sharp and thereby improve the accuracy of the transition state into the first volume V1 and from the first volume V1 intersection of the first field of emission 523a and the receiver field of view 525 (or the first receiver field of view 524a and the emitter 522 in a two receiver, one emitter example) and the transition state and the threshold drop distance at which the second volume V2 begins. As depicted in FIGS. 11B and 11C, the emission 523 defines a "sharp" center emission 523c with minimal drop off edge emissions 523e. The angle γ of the drop off edge emission 523e is less than 1 degree from the center emission 523c. The size of the emission 523 projected the floor surface 10 depends on how narrow the LED beam emission is, and the distance of the floor surface 10 from the second pinch point openings B1, B2. Additionally, in some implementations, the lower pinch point openings B1, B2 are sized at an opening width spanning a distance equivalent to the half power angle of the LED emitters 522. Managing the brightness of the edges of the emission 523 may need narrowing the width of the openings B1, B2. By managing power at edges of the emission 523, the threshold drop distance Ds cutoff is at a crisp intersection points between the emissions 523a, 523b and the receiver field of view 525. This accuracy at the transition points removes surface dependency and improves consistency of sensor response across flooring types and roll and pitch angles of the robot 100.

In order to permit distance measuring with the two-volume truth table implementation of FIGS. 9A and 9B, a second receiver 524c (or second emitter), not shown, could be placed between or beside the emitters 522a, 522b (or receivers 524a, 524b), with a field of view overlapping either or both of near or far volumes of either or both of near or far emitters 522a, 522b (or receivers 524a, 524b). With regard to adding a second receiver 524c to FIG. 9B, the second receiver 524c would be more distant from the candidate surfaces/volumes (near threshold or far stair drop volumes) than the first receiver 524, and would be arranged either on the same side or the opposite side of the first receiver 524 in the manner of FIGS. 8B and 8C. Thus, a hybrid differential/two-volume sensor that combines the two implementations of a three-element sensor would have first and second emitters and first and second receivers. The first receiver would be configured (via lensing on the bottom of the sensor 520, baffling of the housing 514, and view angle theta), to observe a first volume V1 of the first emitter 522a at a near, threshold drop distance Ds and also a second volume V2 of the second emitter 522b at a far, stair drop distance; and the second receiver 524c would be configured to, from a more distant position than the first receiver 524a, observe at least a portion of one or both of the first or second volumes V1, V2.

In operation, the robot would or could follow the same logic as set forth in the truth table of Table 1 and the truth table state diagrams of FIGS. 13A-H. Nonetheless, the hybrid sensor could be used to verify thresholds and gains; verify either the first or second volume contents (with increased gain or bandpass filtering); determine surface type (e.g., among reflective, patterned, hard, soft, shallow or deep pile); and classify situations dependent on surface distance (high centered; pitched; yawed). Alternatively, a different truth table could be synthesized with V1, V2, V3, and V4 conditions, with the V3 and V4 results from the second receiver 524c used for verification, rather than a drive-stop decision.

Figure 12:
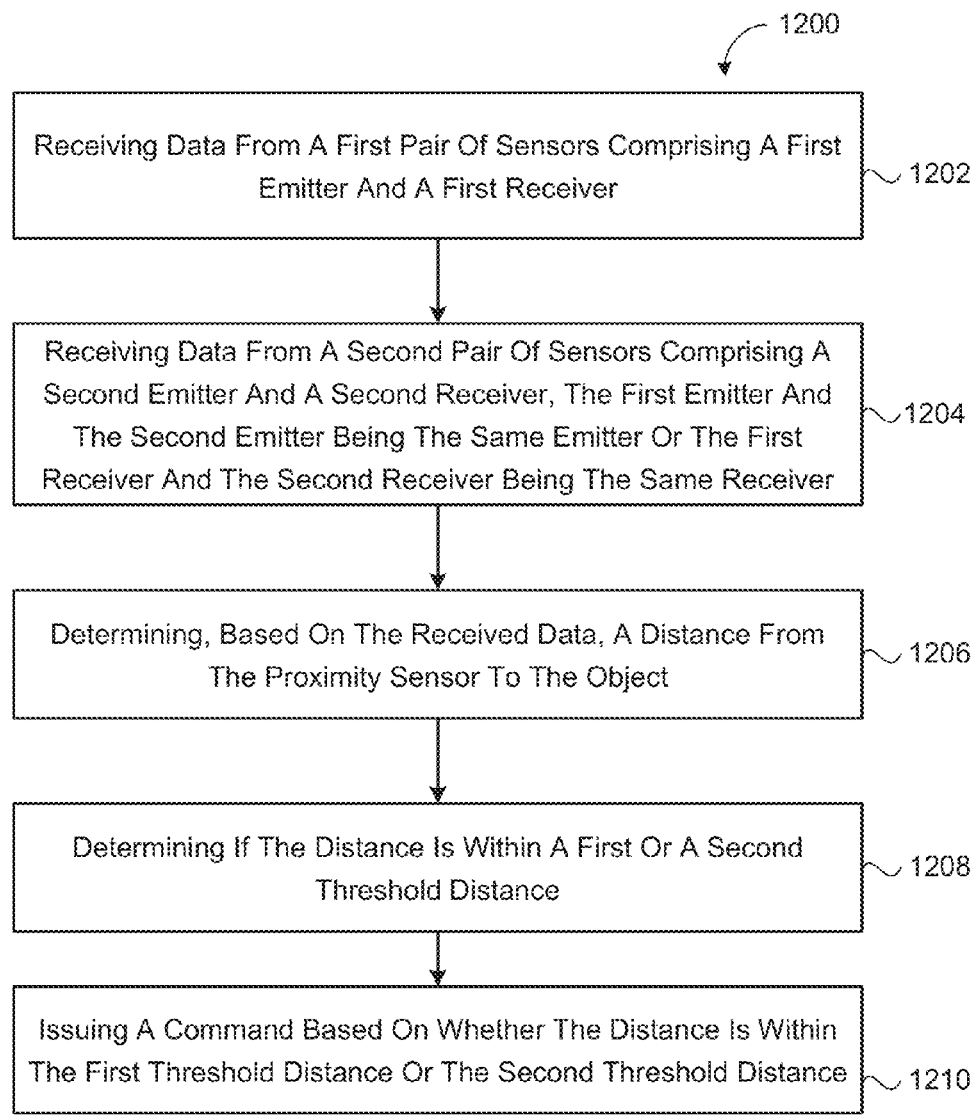
FIG. 12 is a schematic view of an exemplary arrangement of operations for operating the autonomous mobile robot.

FIG. 12 provides an exemplary arrangement of operations for a method 1100 of operating the mobile robot 100. The method 1200 includes receiving 1202, at a computing processor, data from a first sensor 522a, 522b. The first sensor 522a, 522b includes a first emitter 522a and a first receiver 524a. The method 1200 includes receiving 1204, at the computing processor, data from a second sensor 522b, 524b including a second emitter 522b and a second receiver 524b. The first emitter 522a and the second emitter 522b being the same emitter 522 or the first receiver 524a and the second receiver 524b being the same receiver 524. The method 1200 includes determining 1106, using the computing processor, a target distance d between a sensing reference point (e.g., the receiver 524) and a sensed object based on the received data, and determining 1108 if the target distance d is within a first threshold $D_S$ distance or a second threshold distance $D_{NS}$. The method 1200 also includes issuing 1210 a command, from the computing processor, based on whether the target distance d is within the first threshold distance $D_S$ or the second threshold distance $D_{NS}$. In some examples, a processing time of the computing processor between determining if the target distance d is within a first or a second threshold distance and issuing a command is equal to or less than about 10 milliseconds (+/−5 ms). The processing time is based on the distance between the sensor 520 and the caster wheel 126, because the processor needs to determine if it should issue a command to change the direction of the robot 100 before the caster wheel 126 falls off the cliff 12. Therefore, if the caster wheel 126 (or any wheel close to the sensor 520) is within a close distance from the sensor 520, then less time may be needed to determine if the cliff 12 exists and to evaluate if the robot 100 may keep moving. If the distance between the caster wheel 126 (or any other wheel) is greater, the robot may use more time to make its decisions.

Referring back to FIG. 9A, in some implementations, if the first emitter 522a and the second emitter 522b are the same, the method 1200 further includes emitting light from the first emitter 522a along a first field of view 523, and receiving reflections of the light at the first receiver 524a along a second field of view 525a. In addition, the method 1200 includes receiving reflection of the light at the second receiver 524b along a third field of view 525b. The first field of view 523 intersects the second and third fields of view 525a, 525b. The intersection of the first and second fields of views 523, 525a defines a first volume V1, and the intersection of the first and third fields of view 523, 525b defines a second volume V2. The first volume V1 detects a first floor surface 10a within the first threshold distance $D_S$ from the sensing reference point (e.g., robot body 110), and the second volume V2 detects a second floor surface 10b within a second threshold distance, greater than the first threshold distance $D_S$, from the sensing reference point. The first, second, and third fields of view 523, 525a, 525b may define first, second, and third field of view axes $F_{523}$, $F_{525a}$, $F_{525b}$ respectively, where the second and the third fields of view 525a, 525b axes are parallel. Additionally or alternatively, the method 1100 may include arranging a field of view axis $F_{523}$ defined by the first field of view 523 at an angle between about 5 degrees and about 15 degrees with respect to a common longitudinal sensing axis Ys, and arranging field of view axes $F_{525a}$, $F_{525b}$ defined by the second and third fields of view 525a, 525b at an angle of between 0 and about 10 degrees with respect to the common longitudinal sensing axis Ys.

Referring back to FIG. 9B, in some implementations, if the first receiver 524a and the second receiver 524b are the same, the method 1200 further includes receiving reflections of the light along a first field of view 525, and emitting light from the first emitter 522a along a second field of view 523a. The method 1200 also includes emitting light from the second emitter 522b along a third field of view 523b. The first field of view 525 intersects the second and third fields of view 523a, 523b, where the intersection of the first and second fields of view 525, 523b defines a first volume V1. The intersection of the first and third fields of view 525, 523b defines a second volume V2. The first volume V1 detects a first floor surface 10a within the first threshold distance $D_S$ from the sensing reference point, and the second volume V2 detects a second floor surface 10b within a second threshold distance from the sensing reference point, being a distance greater than the first threshold distance $D_S$. The first, second, and third fields of view 525, 523a, 523b define first, second, and third field of view axes $F_{525}$, $F_{523a}$, $F_{523b}$ respectively, where the second and the third fields of view 523a, 523b axes are parallel. Additionally or alternatively, the method 1200 may include arranging a field of view axis $F_{525}$ defined by the first field of view 525 at an angle between about 5 degrees and about 15 degrees with respect to a common longitudinal sensing axis $Y_S$, and arranging field of view axes $F_{523a}$, $F_{522b}$ F defined by the second and third fields of view 523a, 523b at an angle of between 0 and about 10 degrees with respect to the common longitudinal sensing axis $Y_S$.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the examples described above should not be understood as requiring such separation in all examples, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An autonomous robot comprising:
a robot body defining a forward drive direction;
a drive system supporting the robot body and configured to maneuver the robot over a floor surface;
a sensor system disposed on the robot body, the sensor system comprising at least one proximity sensor, wherein the proximity sensor comprises:
a sensor body;
first, second, and third components housed by the sensor body, the first component being one of an emitter and a receiver and each of the second component and the third component being the remaining one of an emitter and a receiver;
wherein the first component has a first field of view, the second component has a second field of view, and the third component has a third field of view, the first field of view intersecting the second field of view and the third field of view; and
wherein the intersection of the first and second fields of views defines a first volume and the intersection of the first and third fields of view defines a second volume, the first volume detecting a first surface within a first threshold distance from a sensing reference point and the second volume detecting a second surface within a second threshold distance from the sensing reference point, the second threshold distance being greater than the first threshold distance; and
a controller in communication with the drive system and the sensor system and having a computing processor processing data received from the sensor system, the controller issuing a command based on the received data.

2. The robot of claim 1, further comprising two or more proximity sensors, the controller sequentially enabling and disabling each proximity sensor with a threshold period of time between disabling one sensor and enabling another sensor.

3. The robot of claim 1, wherein the controller determines a target distance between a sensing reference point and a sensed object and issues a drive command to the drive system if the target distance to the object is within the second threshold distance, the drive command changing the direction of the robot from a forward drive direction to a drive direction other than forward.

4. The robot of claim 1, wherein the sensor body comprises at least two baffles arranged to define the field of view of at least one component.

5. The robot of claim 1, wherein a first distance between the first component and the second component is less than a second distance between the second component and the third component.

6. The robot of claim 1, wherein each component defines a field of view axis and the sensor body defines a transverse axis and a longitudinal axis, the components disposed along the transverse axis with their field of view axes arranged at an angle with respect to the longitudinal axis.

7. The robot of claim 6, wherein the field of view axes of the second component and the third component are not parallel.

8. The robot of claim 7, wherein field of view axes of the second component and the third component are each arranged at an angle of between 0 and about 10 degrees with respect to a longitudinal axis defines by the sensor body towards a rearward portion of the robot body.

9. The robot of claim 6, wherein the field of view axis of the first component is arranged at an angle between about 5 degrees and about 15 degrees with respect to the longitudinal axis, the angle of the field of view axis of the first sensor component being greater than the angles of the field of view axes of the second and third components.

10. The robot of claim 1, wherein the first threshold distance is about 1 to 3 inches and/or the second threshold distance is greater than 3 inches.

11. An autonomous robot comprising:
a robot body defining a forward drive direction;
a drive system supporting the robot body and configured to maneuver the robot over a surface;
at least one proximity sensor comprising:
a first component having a first field of view;
a second component having a second field of view, the first field of view intersecting the second field of view to form a first volume of intersection;
a third component having a third field of view, the first field of view intersecting the third field of view to form a second volume of intersection, the second volume of intersection being more distant from the robot body than the first volume of intersection;
wherein the first component is one of an emitter and a receiver, and each of the second component and third component is the remaining one of an emitter and a receiver, and
a controller in communication with the drive system and configured to issue a drive command to the drive system to maneuver the robot based on a signal from the at least one proximity sensor generated when an object interferes with at least one of the first and second volumes of intersection.

12. The robot of claim 11, the controller sequentially enabling and disabling each of the second and third components such that only one of the second and third components is actuated at one time.

13. The robot of claim 11, wherein the controller issues a drive command to the drive system if the object interferes with the second volume of intersection, the drive command changing the direction of the robot from a forward drive direction to a drive direction other than forward.

14. The robot of claim 11, wherein the at least one proximity sensor further comprises a sensor body having at least two baffles arranged to define the field of view of at least one component.

15. The robot of claim 14, wherein each component defines a field of view axis and the sensor body defines a transverse axis and a longitudinal axis, the components disposed along the transverse axis with their field of view axes arranged at an angle with respect to the longitudinal axis.

16. The robot of claim 14, wherein a first distance between the first component and the second component is less than a second distance between the second component and the third component.

17. The robot of claim 16, wherein the field of view axes of the second component and the third component are not parallel.

18. The robot of claim 17, wherein field of view axes of the second component and the third component are each arranged at an angle of between 0 and about 10 degrees with respect to a longitudinal axis defined by the sensor body towards a rearward portion of the robot body.

19. The robot of claim 16, wherein the field of view axis of the first component is arranged at an angle between about 5 degrees and about 15 degrees with respect to the longitudinal axis, the angle of the field of view axis of the first component being greater than the angles of the field of view axes of the second and third components.

20. The robot of claim 11, wherein the first volume of intersection extends approximately from the robot body to approximately 5 cm, and the second volume of intersection extends approximately from 3 to 5 cm from the robot body to a distance remote from the robot body.

* * * * *